US011271300B2

(12) United States Patent
Reynolds et al.

(10) Patent No.: US 11,271,300 B2
(45) Date of Patent: Mar. 8, 2022

(54) CAVITY-BACKED ANTENNA ARRAY WITH DISTRIBUTED SIGNAL AMPLIFIERS FOR TRANSMISSION OF A HIGH-POWER BEAM

(71) Applicant: Searete LLC, Bellevue, WA (US)

(72) Inventors: Matthew S. Reynolds, Seattle, WA (US); Guy Lipworth, Bellevue, WA (US); Joseph Hagerty, Seattle, WA (US); Daniel Arnitz, Seattle, WA (US); Yaroslav Aleksandrovich Urzhumov, Bellevue, WA (US)

(73) Assignee: Searete LLC, Bellevue, WA (US)

( * ) Notice: Subject to any disclaimer, the term of this patent is extended or adjusted under 35 U.S.C. 154(b) by 673 days.

(21) Appl. No.: 16/112,539

(22) Filed: Aug. 24, 2018

(65) Prior Publication Data

US 2020/0067186 A1    Feb. 27, 2020

(51) Int. Cl.
| | |
|---|---|
| *H01Q 3/32* | (2006.01) |
| *H01Q 21/06* | (2006.01) |
| *H02J 7/02* | (2016.01) |
| *H02J 50/23* | (2016.01) |
| *B64C 39/02* | (2006.01) |

(Continued)

(52) U.S. Cl.
CPC ............... *H01Q 3/32* (2013.01); *B60L 53/12* (2019.02); *B64C 39/024* (2013.01); *B64F 1/362* (2013.01); *H01P 7/06* (2013.01); *H01Q 21/065* (2013.01); *H02J 7/025* (2013.01); *H02J 50/23* (2016.02);

(Continued)

(58) Field of Classification Search
CPC ......... H01Q 3/32; H01Q 21/065; H02J 50/23; H02J 7/025; B60L 53/12; B60L 2200/10; B64C 39/024; B64C 2201/066; B64F 1/362; H01P 7/06
See application file for complete search history.

(56) References Cited

U.S. PATENT DOCUMENTS 9,450,310 B2 * 9/2016 Bily ................... H01Q 15/0066
11,091,043 B2    8/2021 Wang
(Continued)

OTHER PUBLICATIONS

International Searching Authority, "International Search Report from PCT Application No. PCT/US2019/047720", from Foreign Counterpart to U.S. Appl. No. 16/112,552, filed Dec. 6, 2019, pp. 1 through 9, Published: WO.

(Continued)

*Primary Examiner* — Jason C Smith
(74) *Attorney, Agent, or Firm* — Fogg & Powers LLC

(57) ABSTRACT

An embodiment of an antenna array includes a cavity, signal couplers, and antenna elements. The cavity is configured to reinforce a reference signal (e.g., a standing reference wave) having a wavelength λ, and each of the signal couplers is configured to generate a respective intermediate signal in response to the reference signal at a respective location of the cavity. And each of the antenna elements (e.g., conductive patches) is configured to radiate a respective elemental signal in response to an intermediate signal from a respective one of the signal couplers. In operation, the elemental signals interfere with one another to form a transmission beam. Controlling the cavity to introduce phase differences between the antenna elements can allow a wider pitch between adjacent antenna elements without the need for large, costly phase shifters, where the pitch can approach its theoretical limit of approximately λ/2.

31 Claims, 18 Drawing Sheets

(51) Int. Cl.
 *B64F 1/36* (2017.01)
 *H01P 7/06* (2006.01)
 *B60L 53/12* (2019.01)
(52) U.S. Cl.
 CPC ..... *B60L 2200/10* (2013.01); *B64C 2201/066* (2013.01)

(56) References Cited

U.S. PATENT DOCUMENTS

| | | | |
|---|---|---|---|
| 11,091,056 B2 | 8/2021 | Hashimoto et al. | |
| 2006/0187126 A1* | 8/2006 | Sievenpiper | H01Q 15/008 343/700 MS |
| 2010/0311355 A1* | 12/2010 | Rofougaran | H01Q 1/2283 455/91 |
| 2012/0249374 A1* | 10/2012 | Wang | H01Q 3/26 343/700 MS |
| 2015/0318618 A1* | 11/2015 | Chen | H01Q 9/0442 343/750 |
| 2016/0372834 A1 | 12/2016 | Bily et al. | |
| 2020/0067186 A1* | 2/2020 | Reynolds | B60L 53/10 |
| 2020/0067187 A1 | 2/2020 | Reynolds et al. | |
| 2021/0218279 A1 | 7/2021 | Sun et al. | |

OTHER PUBLICATIONS

Tsai et al., "A Novel Amplifying Antenna Array Using Patch-Antenna Couplers—Design and Measurement", IEEE Transactions on Microwave Theory and Techniques, Aug. 2002, pp. 1919 through 1926, vol. 50, No. 8, IEEE.

Reynolds, Matthew S., et al. "Waveguide-Backed Antenna Array With Distributed Signal Amplifiers for Transmission of a High-Power Beam"; U.S. Appl. No. 16/112,552, filed Aug. 24, 2018; pp. 1-107; Published: US.

U.S. Patent and Trademark Office, "Restriction Requirement", U.S. Appl. No. 16/112,552, filed Apr. 9, 2021, pp. 1 through 6, Published: US.

U.S. Patent and Trademark Office, "Office Action", U.S. Appl. No. 16/112,552, filed Aug. 23, 2021, pp. 1 through 23, Published: US.

\* cited by examiner

CAVITY-BACKED ANTENNA ARRAY WITH DISTRIBUTED SIGNAL AMPLIFIERS FOR TRANSMISSION OF A HIGH-POWER BEAM

CROSS-REFERENCE TO RELATED APPLICATION(S)

This application is related to U.S. patent application Ser. No. 16/112,552, filed Aug. 24, 2018 and titled "WAVEGUIDE-BACKED ANTENNA ARRAY WITH DISTRIBUTED SIGNAL AMPLIFIERS FOR TRANSMISSION OF A HIGH-POWER BEAM," the content of which is incorporated herein by reference.

SUMMARY

Although examples of one or more embodiments, and examples of problems solved by one or more embodiments, are described with reference to flying drones, one or more embodiments relate generally to electronically steerable antennas, to wireless power transfer, and to electronically steerable antennas for wireless power transfer.

Systems that incorporate flying drones (hereinafter "flying drones" or "drones") are being used, or are being considered, for many types of applications and tasks such as site security. For example, drone systems are being considered for monitoring the grounds of secure facilities such as nuclear power plants and government installations, and for carrying items from one location to another (e.g., package delivery). To perform such monitoring, the drones would be fitted with video cameras, other imaging equipment (e.g., infrared ("night vision") imaging equipment, thermal imaging equipment), or other types of sensors (e.g., sound/vibration sensors, chemical sensors, temperature sensors). And to perform such carrying, the drones would be stripped of unnecessary accessories and weight so as to increase the size and weight of an item that the drones are configured to carry.

A flying drone typically runs on electric power, and, therefore, includes one or more batteries configured to provide electrical power for the drone's subsystems and assemblies (e.g., engine/motor assembly, imaging subsystem, sensor subsystem, navigation subsystem, steering assembly, illumination subsystem, computing/control subsystem, electrical/electronic subsystem).

Because a battery can hold only a finite amount of energy/charge, each of an active drone's one or more batteries typically requires periodic charging.

To charge its one or more batteries, a drone is typically taken out of service, and returned to a charging "base" or "bay."

Unfortunately, the need to take each drone out of service periodically for battery charging can increase the acquisition and maintenance costs, the complexity, and the component count of a drone system. For example, suppose that to monitor a nuclear power plant for security purposes, at least two drones of a drone security system must be in service (e.g., airborne) at all times. Further suppose that each drone includes a single battery having a twenty-minute service time under full load, that the drone system takes each drone out of service (on a staggered basis) for battery charging after each twenty-minute in-service window, that a drone's battery requires up to one hour to fully charge after each in-service window, and that the drone system can charge the respective batteries of two drones at a time. Therefore, to maintain at least two drones in service at all times, the drone system includes at least four drones such that while the system is charging the batteries of two drones, the system is maintaining the other two drones in service to provide site security; but the drone system probably would include more than four drones to provide redundancy in case one drone malfunctions and needs to be taken out of service for an extended period of time for repairs. Because a drone system separately tracks and controls each drone, the complexity of a drone system typically increases with each drone added to the system. Furthermore, because the price of a drone outfitted with security equipment (e.g., a camera and one or more other sensors) can range between approximately US$5000-US$100,000+, and because there is a cost to maintain the drone and its onboard equipment, the acquisition and maintenance costs of a drone system typically increase with each drone added to the system. To reduce the number of drones, an alternative drone system may include fewer drones and more batteries, such that when a drone's battery needs to be charged, the drone is taken out of service, its depleted battery is replaced with a fully charged battery, and the drone is put back into service. Assuming the battery replacement takes a minute or two, fewer drones are needed because fewer drones are out of service at any one time. But because a drone discharges a battery (e.g., in about 20 minutes) more quickly than a battery charger can charge the battery (e.g., about 80 minutes for fully charging a battery from a depleted level), such a drone system has a relatively large number of batteries and battery chargers per drone (e.g., four batteries and four battery chargers per drone). Furthermore, such a drone system includes a relatively complex, high-maintenance, and expensive automatic battery swapper, or depends on one or more humans for battery replacement. Therefore, although such an alternative drone system may include fewer drones than the previously described drone system, the alternative drone system may be just as expensive to acquire and to maintain as the previously described drone system.

Therefore, a battery-charging subsystem that allows a drone system to include fewer drones, or fewer (or no) batteries and battery chargers and fewer or no mechanical or human battery changers, can reduce, significantly, the complexity and costs of the drone system.

Furthermore, a battery-charging subsystem that allows a reduction in the size of a drone battery can allow a drone of a given size to carry larger or heavier items.

An example of such a battery-charging subsystem includes an antenna configured to form, and to direct toward a flying drone, a high-power energy beam (e.g., a beam with a power $\geq 1$ kilowatt (KW)). For example, the antenna can be a metamaterial surface-scattering antenna (MSAT).

Battery-charging circuitry onboard the drone is configured to convert the energy beam into a battery-charging signal, and to charge one or more batteries onboard the drone in response to the battery-charging signal, while the drone is flying or is otherwise in service.

And the onboard battery-charging circuitry also can be configured to power the drone, partially or fully, while the circuitry is charging one or more onboard batteries, and can be configured to power the drone fully while no battery, fully charged battery(ies), or one or more depleted batteries, are onboard the drone.

By enabling the charging of a drone's battery, and powering of the drone independent of the battery, while the drone is in service, such a battery-charging subsystem allows a reduction in the minimum number of drones in a drone system. For example, further to the above example in which a drone's battery has a twenty-minute life under full load and takes up to one hour to fully charge, a drone system that includes the aforementioned battery-charging subsystem needs a minimum of only two drones and two batteries, which is two drones and six batteries fewer than the minimum number of drones and batteries required by an otherwise comparable drone system that lacks the aforementioned battery-charging subsystem. Furthermore, such a battery-charging subsystem eliminates a need for a mechanical or human battery swapper, and allows the drone to carry a larger and heavier payload than an otherwise comparable drone system that lacks the aforementioned battery-charging subsystem.

Furthermore, a problem with some antenna arrays, such as a metamaterial surface scattering antenna (MSAT) array, which could be used, for example, to charge drone batteries, is that because they include no phase shifters, their antenna elements are spaced apart by an amount that is much smaller than the wavelengths of the signals that they are designed to transmit and receive. That is, the pitch, and thus the area density, of antenna elements is relatively high.

But adding phase shifters to such an array is often not feasible because of the cost of, and the lack of space for, such phase shifters.

An embodiment of an antenna that has phase-shifting ability without expensive and large phase shifters includes a cavity, signal couplers, and antenna elements. The cavity is configured to reinforce a reference signal (e.g., a standing reference wave) having a wavelength A, and each of the signal couplers is configured to generate a respective intermediate signal in response to the reference signal at a respective location of the cavity. And each of the antenna elements (e.g., conductive patches) is configured to radiate a respective elemental signal in response to an intermediate signal from a respective one of the signal couplers. In operation, the elemental signals interfere with one another to form a transmission beam. Controlling the cavity to introduce phase shifts between the antenna elements can allow a wider pitch between adjacent antenna elements without the need for expensive phase shifters, where the pitch can approach its theoretical limit of approximately $\lambda/2$.

DETAILED DESCRIPTION

The words "approximately" and "substantially" may be used below to indicate that a quantity can equal a given value ±10% of the value, and that two or more quantities can be exactly equal, or can be within ±10% of each other due to manufacturing tolerances, or other design considerations, of the physical structures described below.

Figure 1:
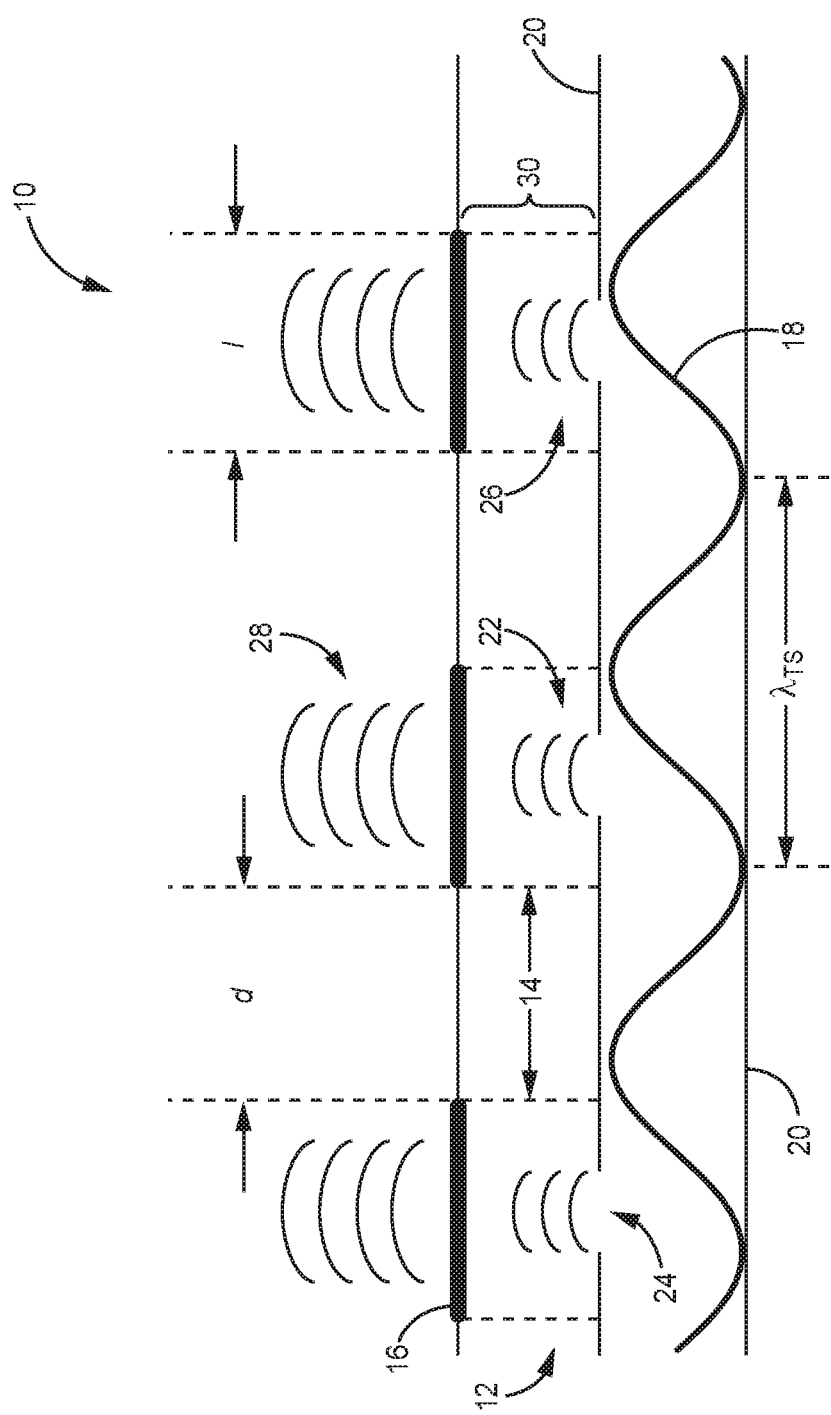
FIG. 1 is a cutaway side view of a waveguide-backed metamaterial surface scattering antenna (MSAT) array.

FIG. 1 is a cutaway side view of a waveguide-backed metamaterial surface scattering antenna (MSAT) array 10, which includes a transmission medium (hereinafter "transmission structure") 12, signal converters, i.e., signal couplers, 14 (hereinafter "signal couplers" or "couplers"), and antenna elements 16.

The transmission structure 12 is configured to allow a travelling reference wave 18 to propagate from one end (e.g., from the left in FIG. 1) to another end (e.g., to the right in FIG. 1) of the transmission structure. For example, the transmission structure 12 can be a three-dimensional waveguide having a rectangular cross section and including an input port (not shown in FIG. 1 but located, e.g., at a left end of the transmission structure) configured to receive the reference wave 18 from a signal generator (not shown in FIG. 1), including an output port (not shown in FIG. 1 but located, e.g., at a right end of the transmission structure), including conductive walls 20 (only upper and lower walls shown in FIG. 1), and including input-port and output-port impedance terminations (not shown in FIG. 1) configured to reduce or to eliminate the occurrence of reflections of the reference wave within the transmission structure. Further in example, the waveguide 12 can be configured such that the reference wave 18 propagates in a $TE_{10}$ mode. Other examples of structures suitable for the transmission structure 12 include a coaxial transmission line, a parallel-plate waveguide, a strip line (e.g., a conductor "sandwiched" between upper and lower reference (e.g., ground) conductors with one or two optional side-wall conductors) and a two-dimensional waveguide.

Each of the signal couplers 14 is configured to convert a portion of the energy carried by the traveling reference wave 18 into a respective intermediate signal 22.

Each of the signal couplers 14 includes a respective slot (e.g., a rectangular slot), hereinafter an iris, 24 formed in a respective location of the upper conductive wall 20 of the transmission structure 12. As it propagates within the transmission structure 12, the reference wave 18 induces currents in the upper conductive wall 20. Each iris 24 radiates a respective iris signal by effectively converting the induced currents into electric and magnetic fields that form the respective iris signal (in this example, the respective iris signal is the same as the respective intermediate signal 22).

Each of the signal couplers 14 also includes a respective signal-coupling region 26 configured to receive an intermediate signal 22 from a respective iris 24 and to couple the intermediate signal to a respective one of the antenna elements 16. The coupling region 26 is configured to have a resonant frequency that is approximately equal to the frequency of the reference wave 18, and, therefore, that is approximately equal to the frequency of the intermediate signal 22. At its resonant frequency, the coupling region 26 presents, at least ideally, a purely resistive (real) impedance to the respective iris 24, and, therefore, couples the iris/intermediate signal 22 to a respective antenna element 16 with approximately the highest level of signal coupling of which the coupling region is capable. For example, the coupling region 26 can be formed from any suitable material such as a semiconductor material, a printed-circuit-board (PCB) material, or other dielectric material. Alternatively, instead of, or in addition to, the coupling region 26 alone having a resonant frequency approximately equal to the frequency of the reference wave 18, a structure formed by the combination of the iris 24 and the coupling region 26, by the combination of the antenna element 16 and the coupling region, or by the combination of the antenna element, coupling region, and iris, can be configured to have a resonant frequency approximately equal to the frequency of the reference wave.

Still referring to FIG. 1, each of the antenna elements 16 is configured to receive an intermediate signal 22 from a respective coupling region 26, to convert the intermediate signal into a respective elemental signal 28, and to radiate the respective element signal. Said another way, the intermediate signal 22 excites the antenna element 16 to radiate the elemental signal 28. For example, each antenna element 16 is, or otherwise forms, a respective patch antenna, or a patch-antenna element, that is configured to radiate the respective elemental signal 28 in a manner similar to the manner in which a resonant patch antenna radiates a signal. Therefore, further to this example, each antenna element 16 has approximately a length l, and each pair of immediately adjacent antenna elements is separated by approximately a distance d, such that a lattice constant l+d of the antenna elements is $(l+d) \ll \lambda_o/2$, where $\lambda_o$ is the free-space wavelength of the reference wave 18, and is approximately equal to the wavelengths of the elemental signals 28 (even though the elemental signal typically propagates through air, the refractive index of air, $n_{air}$, is close enough to unity (unity is the effective refractive index of free space) that the wavelengths of the elemental signals in air can be approximated as the free-space wavelength $\lambda_o$ of the reference wave 18). For example, $(l+d) \approx \lambda_o/10$.

Furthermore, the actual wavelength $\lambda_{TS}$ of the reference wave 18 as it propagates along the transmission structure 12 is given by the following equation:

$$\lambda_{TS} = \frac{\lambda_o}{n_{TS}(\lambda_0)} \quad (1)$$

where $n_{TS}(\lambda_o)$ is the index of refraction of the medium that forms the portion of the transmission structure through which propagates a signal having a free-space wavelength of $\lambda_o$. If $n_{TS}$ is independent of wavelength (e.g., $n_{TS}$ has a constant value), then equation (1) reduces to the following equation:

$$\lambda_{TS} = \frac{\lambda_o}{n_{TS}} \quad (2)$$

Unless the transmission structure 12 is filled with air or defines a vacuum, $n_{TS}$ is typically larger than unity, which means that the actual wavelength $\lambda_{TS}$ of the reference wave 18 as it propagates along the transmission structure 12 is typically shorter than the wavelength $\lambda_o$ of the elemental signals 28.

That is, although, in FIG. 1, $\lambda_{TS}$ is shown as being approximately equal to $\lambda_o$, typically $\lambda_{TS} < \lambda_o$. For example, $\lambda_{TS}$ can be in an approximate range of $0.25\lambda_o$ to $0.99\lambda_o$.

A reason for the lattice constant (l+d) being much less than $\lambda_o/2$ is that because the MSAT antenna array 10 includes no phase shifters, the antenna elements 16 are positioned close enough together, and are made small enough, to sample different relative phases of the reference wave 18, which itself may have a wavelength $\lambda_{TS}$ that is much shorter than A. Although the lattice constant (l+d) shown in FIG. 1, and in at least some of the other figures, is approximately equal to $\lambda_{TS}$, it is understood that an embodiment of the antenna array 10, and embodiments of one or more of the antenna arrays described below, can have lattice constants (l+d) that are significantly different than $\lambda_{TS}$.

Still referring to FIG. 1, each combination of a respective signal coupler 14 and a corresponding antenna element 16 forms a respective antenna unit 30.

A control circuit (not shown in FIG. 1) is configured to control the radiating level, i.e., radiating power, of each antenna unit 30. For example, the control circuit can be configured to turn an antenna unit 30 "on" (antenna element 16 radiates an elemental signal 28 at a non-zero power) and "off" (antenna element radiates an elemental signal at a lower, or zero, power) in a binary fashion, or to adjust the power level of the elemental signal in an analog or digital (i.e., a "grayscale") fashion. For example, to allow the control circuit to turn an antenna unit 30 "on" and "off," the antenna unit can include a respective PIN diode (not shown in FIG. 1) coupled between the antenna element 16 and a reference voltage (e.g., ground). The control circuit is configured to turn the antenna unit 30 "off" by forward biasing or reverse biasing the diode, and is configured to turn the antenna unit "on" by oppositely biasing the diode.

By controlling the radiating levels of the antenna elements 16 according to a radiating pattern, a control circuit (not shown in FIG. 1) can control the antenna array 10 to generate a corresponding transmission-beam pattern having one or more main transmission beams.

And by controlling the radiating levels of the antenna elements 16 according to a time sequence of radiating patterns, a control circuit (not shown in FIG. 1) can control the antenna array 10 to steer the one or more main transmission beams in one or two dimensions.

Still referring to FIG. 1, the MSAT array 10 can include one or more components not described in conjunction with FIG. 1, and can omit one or components that are described in conjunction with FIG. 1. For example, one or more components of the MSAT array 10 can be similar to MSAT components described in U.S. Pat. No. 9,450,310 and in U.S. Patent Pub. No. 2015/0318618, which are incorporated by reference.

Still referring to FIG. 1, a potential problem with the MSAT array 10 is that its structure may limit the power levels of the elemental signals 28, and, therefore, may limit the power level of the transmission beam(s) that the array forms.

And such a limit on the transmission-beam power level may render the MSAT array 10 unsuitable for applications, such as wireless battery-charging, that call for a higher-power transmission beam.

For example, suppose an application calls for the MSAT array 10 to generate a main transmission beam having a power level of approximately 1.0 kW.

Further in example, suppose that to account for power losses in the transmission structure 12, signal couplers 14, and antenna elements 16, a 1.5 kW reference signal 18 would be needed at the input port (not shown in FIG. 1) of the transmission structure so that the MSAT array 10 could generate a 1.0 kW transmission beam.

But receiving a reference wave 18 having such a high power may temporarily render the MSAT array 10 inoperable, or may permanently damage the array. For example, such a high-power reference wave 18 may cause the MSAT 10 to overheat, particular at and near the reference-wave input port (not shown in FIG. 1), and such overheating may temporarily disable the array by triggering the array's overheating protection, or may permanently damage the array by causing the melting of one or more of the array's structures or components.

Figure 2:
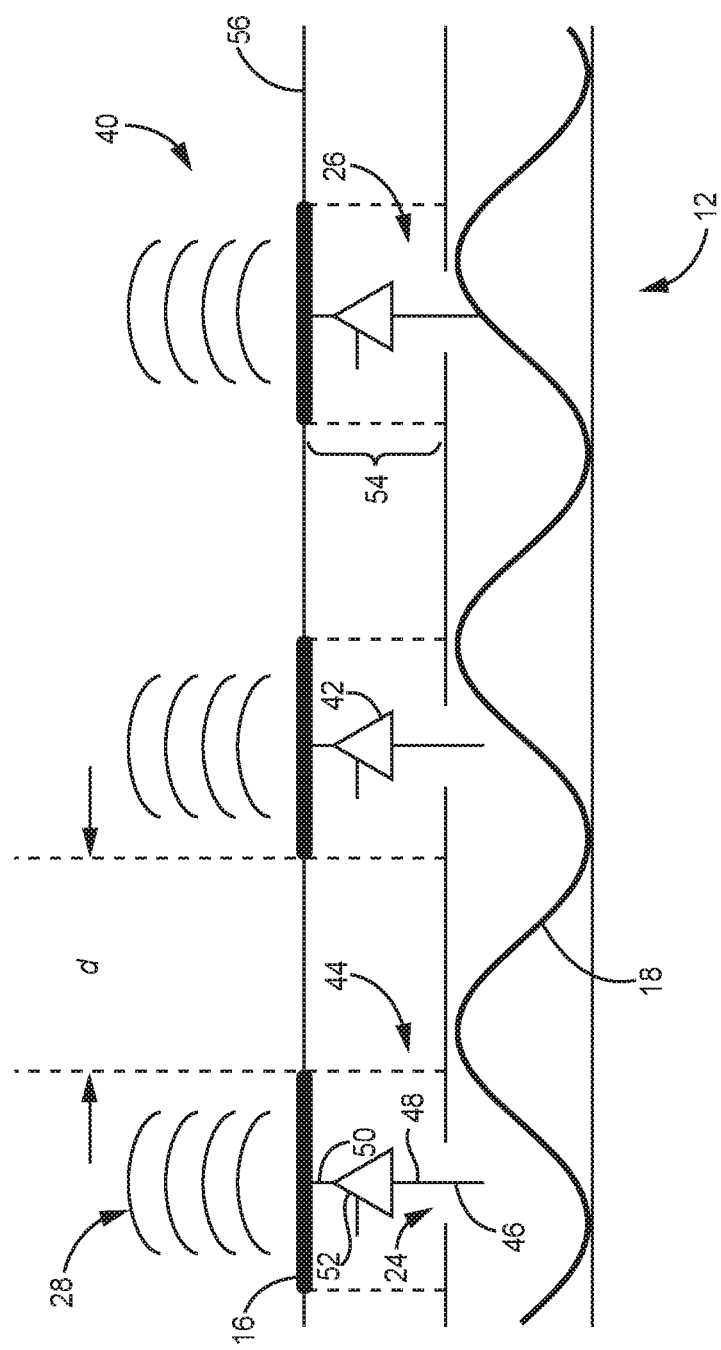
FIG. 2 is a cutaway side view of a waveguide-backed MSAT including distributed controllable signal amplifiers, according to an embodiment.

FIG. 2 is a cutaway side view of a waveguide-backed MSAT array 40, which is configured to generate a transmission beam having a power that is significantly higher than the power of a transmission beam that the MSAT array 10 of FIG. 1 is configured to generate, according to an embodiment. In FIG. 2, components common to FIG. 1 are labeled with like reference numbers.

Like the MSAT array 10 of FIG. 1, the MSAT array 40 includes a transmission structure 12 and antenna elements 16.

But unlike the MSAT array 10 of FIG. 1, the MSAT array 40 includes active amplifiers 42, which are located, arranged, and otherwise distributed and configured, to prevent damage to the array while the array is generating a higher-power (e.g., ≥1.0 kW) transmission beam. For example, the amplifiers 42 effectively distribute power generation, and, therefore, effectively distribute heat generation, over a relatively large region of the antenna array 40 to prevent the generation of "hot spots" having temperatures high enough to damage the antenna array.

Furthermore, the MSAT 40 includes signal-couplers 44, which are similar to the signal-couplers 14 of the MSAT array 10 of FIG. 1 except that the couplers 44 also include conductive probes 46. Each probe 46 extends through a respective iris 24 into the transmission structure 12, and is configured to generate an intermediate signal in response to the reference wave 18. Alternatively, each conductive probe 46 is configured to generate an intermediate signal in response to an iris signal generated by the respective iris 24. In the latter configuration, the probe 46 may not extend into the transmission structure 12, but, instead, may extend partially or fully into the iris 24, or may extend only to a location over the iris.

Each of the amplifiers 42 is disposed in a respective coupling region 26, and includes an input node 48 coupled to a respective conductive probe 46, an output node 50 coupled to a respective antenna element 16, and a control node 52 configured for coupling to a control circuit (not shown in FIG. 2); furthermore, the combination of an antenna element 16, a corresponding coupling region 26, a corresponding amplifier 42, and a corresponding signal coupler 44 forms a respective antenna unit 54. Moreover, although not shown, each amplifier 42 includes a power terminal configured to receive operating power. And, although the amplifier output node 50 of each amplifier 42 is shown coupled to a center of a respective antenna element 16, the amplifier output node can be coupled to any suitable location of the respective antenna element, for example, so that the impedance of the respective antenna element at the coupling location approximately matches the output impedance of the amplifier.

By generating a binary control signal on the control node 52, the control circuit (not shown in FIG. 2) can turn the amplifier "on" and "off." While "on," the amplifier 42 receives from the probe 46, and amplifies, the intermediate signal with a gain, and provides, via the output node 50, the amplified intermediate signal to the antenna element 16, which effectively converts the amplified intermediate signal into an elemental signal 28, and which radiates the elemental signal. Alternatively, by generating an analog control signal, or a digital signal having more than two values, the control circuit not only can turn the amplifier 42 "on" and "off," but the control circuit also can control the gain of the amplifier between "on" and "off."

Furthermore, each of the amplifiers 42 can have any suitable circuit topology and operational parameters, and can be located at any suitable location of the MSAT array 40. For example, each of one or more of the amplifiers 42 can include a single transistor having its control node (e.g., a base if the transistor is a bipolar junction transistor (BJT), a gate if the transistor is a field-effect transistor (FET)) coupled to the control node 52 of the amplifier, and having its conduction nodes (collector and emitter if the transistor is BJT, drain and source if the transistor is an FET) coupled to the input node 48 and output node 50 of the amplifier. Or, each of one of more of the amplifiers 42 can include, or be, a surface-mount operational amplifier having a voltage- or current-controlled gain. In further example, each of one or more of the amplifiers 42 can be located on an upper surface 56 of the MSAT array 40 instead of in a respective coupling region 26 of the coupler 44.

As stated above, by including a respective amplifier 42 for each antenna unit 54, the MSAT array 40 may be less prone to malfunction and damage than the MSAT array 10 of FIG. 1 while being fed with a high-power reference wave 18. For example, the distribution of the amplifiers 42 can distribute power losses, and the heat generated by those loses, over a relatively large area of the MSAT array 40 such that no one region of the MSAT experiences temperatures high enough to disable or damage the MSAT. Furthermore, including a larger number of smaller amplifiers 42 can increase the efficiency (e.g., (power in)/(power out)) of the MSAT 40 as compared to an MSAT that includes a smaller number of larger amplifiers. Moreover, including a respective adjustable-gain amplifier 42 as a component of each of at least some of the antenna units 54 can allow a control circuit (not shown in FIG. 2) to steer a beam generated by the MSAT array 40 with a higher degree of resolution as compared to an MSAT array with no respective signal-amplification control for individual antenna units.

Still referring to FIG. 2, operation of the MSAT array 40 is described, according to an embodiment. Although operation of one antenna unit 54 is described, it is understood that others of the antenna units can be configured to operate in a similar fashion. Furthermore, the reference wave 18 can have any suitable power level (e.g., ≥250 Watts (W)) at the input port (not shown in FIG. 2) to the transmission structure 12. For example, an amplifier 42 having a gain of 30 dB can generate an elemental signal 28 having a power of 1 W in response to a signal having a power of 1 milliwatt (mW) at its input node 48. Consequently, such an embodiment of the array 40 having one thousand antenna elements 16 can generate a transmission beam of about 1 KW from a reference wave 18 of 100 mW-10 W at the reference-wave input port (not shown in FIG. 2).

The probe 46 generates an intermediate signal in response to the reference wave 18.

The amplifier 42 generates an amplified intermediate signal on the amplifier output node 50 by amplifying the intermediate signal on the amplifier input node 48 in response to the gain-control signal that the control circuit (not shown in FIG. 2) generates on the gain-control node 52; the magnitude of the gain with which the amplifier amplifies the intermediate signal can be greater than one, less than one, or one.

The antenna element 16 radiates an elemental signal 28 in response to the amplified intermediate signal from the amplifier 42.

Other active antenna units 54 operate in a similar manner to generate respective other elemental signals 28.

The control circuit (not shown in FIG. 2) can deactivate one or more of the other antenna units 54 by generating, on the gain-control nodes 52, respective signals that cause the corresponding amplifiers 42 to have gains of approximately zero.

The elemental signals 28 generated by the active ones of the antenna elements 16 interfere with one another to form a beam pattern that corresponds to the gain and phase pattern of the antenna units.

Next, the control circuit (not shown in FIG. 2) causes the MSAT array 40 to steer one or more main beams generated by the active ones of the antenna elements 16 by time sequencing the antenna units 54 through different gain and phase patterns in the manner described above.

Still referring to FIG. 2, alternate embodiments of the MSAT array 40 are contemplated. For example, although described as being located in the coupling regions 26, one or more of the amplifiers 42 can be located elsewhere in or on the MSAT array 40, such as on an MSAT surface 56. Furthermore, although each antenna unit 54 is described as including a respective amplifier 42, one or more of the antenna units may lack an amplifier; therefore, such amplifier-lacking antenna units may be similar to the antenna units 30 of FIG. 1. Moreover, although shown as having a single row of antenna units 54, the MSAT array 40 may have multiple rows of antenna units arranged in a rectangular pattern or in a pattern of another shape. In addition, although the antenna units 54 are described as being arranged in a two-dimensional array, they may be arranged in a one-dimensional or three-dimensional array. Furthermore, although described as including a single transmission structure 12, the MSAT array 40 can include multiple transmission structures, for example, one transmission structure per row of antenna units 54. Moreover, although described as being a three-dimensional, the transmission structure 12 can be two-dimensional. In addition, although described as being on the same side (i.e., the top) of the transmission structure 12, one or more of the antenna elements 16, amplifiers 42, and couplers 44 can be disposed on different sides of the transmission structure. In addition, embodiments and alternate embodiments described in conjunction with FIGS. 1 and 3-21 may be applicable to the MSAT array 40.

Figure 3:
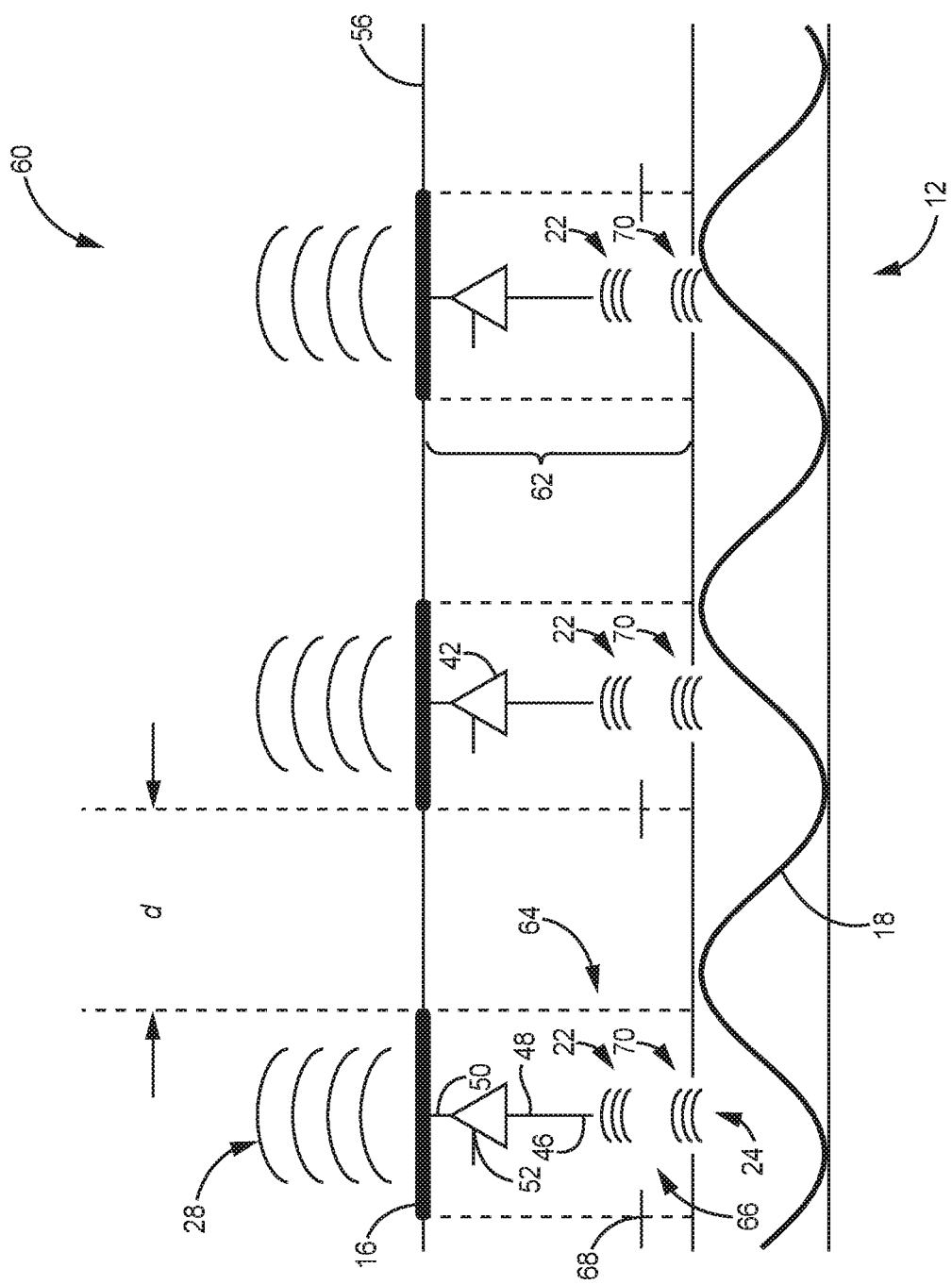
FIG. 3 is a cutaway side view of a waveguide-backed MSAT including distributed controllable signal amplifiers and controllable signal couplers, according to an embodiment.

FIG. 3 is a cutaway side view of a waveguide-backed MSAT array 60, which is similar to the MSAT array 40 of FIG. 2 except that the probes 46 are separated from their respective irises 24, and antenna units 62 include signal couplers 64 having coupling regions 66 with controllable impedances, according to an embodiment; furthermore, components in FIG. 3 common to FIG. 1 or FIG. 2 are labeled with like reference numbers. Separating the probes 46 from the irises 24, and configuring the coupling regions 66 to have controllable impedances, can provide the MSAT 60 with another variable for generating beam patterns and for steering main transmission beams.

The signal couplers 64 of the MSAT array 60 are similar to the couplers 44 of the MSAT array 40 of FIG. 2 except that each coupler 64 includes a respective coupling region 66 having an impedance-control node 68 and configured to impart, to a respective iris signal 70, a phase shift responsive to an impedance-control signal on the impedance-control node 68. The impedance-control signal can be an analog signal, or a digital signal having two (binary) or more potential values. By generating a control signal on the impedance-control node 68, a control circuit (not shown in FIG. 3) can shift the phase that the coupling region 66 imparts to an iris signal 70 by shifting the impedance, and thus the resonant frequency, of the coupling region. As described above in conjunction with FIG. 1, while the resonant frequency of a coupling region 66 approximately equals the frequency of the reference signal 18, the coupling region has only a real impedance; that is, the coupling region has, at least ideally, zero imaginary impedance and, therefore, imparts no phase shift to the iris signal 70 such that the phases of the iris signal and the intermediate signal 22 are, at least ideally, the same. But as the control circuit shifts the resonant frequency of the coupling region 66 away from the frequency of the reference signal 18, the coupling region has both a real impedance and an imaginary impedance; that is, the coupling region imparts non-zero imaginary impedance and, therefore, and a non-zero phase shift, to the iris signal 70 such that the phases of the iris signal and the intermediate signal 22 are different. For example, if the control circuit generates, on the impedance-control node 68, an impedance-control signal that causes the impedance of the coupling region 66 to be inductive, then the coupling region imparts a phase lag to the iris signal 70 such that the phase of the intermediate signal 22 lags the phase of the reference wave 18; in contrast, if the control circuit generates an impedance-control signal that causes the impedance of the coupling region to be capacitive, then the coupling region imparts a phase lead to the iris signal such that the phase of the intermediate signal leads the phase of the reference wave.

Allowing a control circuit (not shown in FIG. 3) to shift the phase of the intermediate signal 22 relative to the phase of the reference wave 18 introduces another parameter that the control circuit can alter to generate beam patterns and for steering one or more main transmission beams. The addition of this parameter can increase the number of beam patterns that the control circuit can cause the antenna elements 16 to generate, and, therefore, can increase the resolution with which the control circuit can steer one or more main beams generated by the radiating ones of the antenna elements. Although shifting the resonant frequency of the coupling region 66 away from the frequency of the reference wave 18 can cause the coupling region to attenuate the iris signal 70 in addition to shifting the phase of the iris signal, the control circuit can compensate for this attenuation by increasing the gain of the amplifier 42 via the gain-control signal that the control circuit can generate on the gain-control node 52.

Still referring to FIG. 3, operation of the MSAT array 60 is described, according to an embodiment. Although operation of one antenna unit 62 is described, it is understood that others of the antenna units can be configured to operate in a similar fashion. Furthermore, the reference wave 18 can have any suitable power level (e.g., ≤250 Watts (W)) at the input port (not shown in FIG. 3) to the transmission structure 12.

The iris 24 of an antenna unit 62 generates an iris signal 70 in response to the reference wave 18.

The coupling region 66 generates the intermediate signal 22 at the probe 46 by shifting the phase of the iris signal 70 in response to the phase-control signal that the control circuit (not shown in FIG. 3) generates on the impedance-control node 68; the phase shift of the intermediate signal relative to the iris signal and to the reference wave 18 can be positive, negative, or zero.

The amplifier 42 generates an amplified intermediate signal on the amplifier output node 50 by amplifying the intermediate signal 22 on the amplifier input node 48 in response to the gain-control signal that the control circuit (not shown in FIG. 3) generates on the gain-control node 52; the magnitude of the gain with which the amplifier amplifies the intermediate signal can be greater than one, less than one, or one.

The antenna element 16 radiates an elemental signal 28 in response to the amplified intermediate signal from the amplifier 42.

Other active antenna units 62 operate in a similar manner to generate respective other elemental signals 28.

The control circuit (not shown in FIG. 3) can deactivate one or more of the other antenna units 62 by generating, on their gain-control nodes 52, respective signals that cause the corresponding amplifiers 42 to have gains of approximately zero.

Alternatively, the control circuit (not shown in FIG. 3) can deactivate one or more of the other antenna units 62 by generating, on the phase-control nodes 68, respective phase-control signals that shift the resonant frequencies of the corresponding coupling regions 66 to frequencies at which the coupling regions significantly attenuate the respective iris signals 70. For example, the control circuit can shift the resonant frequency of a coupling region 66 so far from the frequency of the reference wave 18 that the coupling region has a gain of approximately zero.

Or, the control circuit (not shown in FIG. 3) can deactivate one or more of the other antenna units 62 both by causing the gains of the corresponding amplifiers to be approximately zero and by shifting the resonant frequencies of the corresponding coupling regions 66 to frequencies at which the coupling regions significantly attenuate the respective iris signals 70.

The elemental signals 28 generated by the active ones of the antenna units 62 interfere with one another to form a beam pattern that corresponds to the gain and phase patterns of the antenna units.

Next, the control circuit (not shown in FIG. 3) causes the MSAT array 60 to steer one or more main beams generated by the active ones of the antenna elements 16 by sequencing the antenna units 62 through different gain and phase patterns in the manner described above.

Still referring to FIG. 3, alternate embodiments of the MSAT array 60 are contemplated. For example, although all probes 46 are described as being separated from the respective irises 24, each of one or more of the probes can extend partially or fully into a respective iris, or can extend through the iris and partially into the transmission structure 12. Furthermore, although described as imparting zero phase shift to the iris signals 70 relative to the reference wave 18, one or more of the irises 24 may be configured to impart non-zero phase shifts to the iris signals. Moreover, although each of the coupling regions 66 is described as having a resonant frequency, the combination of one or more of the coupling region, amplifier 42, probe 46, and iris 70 may have a resonant frequency adjustable in response to a control signal on the phase-control node 68, and it may be the adjustment of this resonant frequency that imparts a phase shift to the iris signal 70 or to the intermediate signal 22. For example, a combination of the amplifier 42 and the coupling region 66 can form a resonant circuit having a resonant frequency settable by the phase-control signal. In addition, embodiments and alternate embodiments described in conjunction with FIGS. 1-2 and 4-21 may be applicable to the MSAT array 60.

Figure 4:
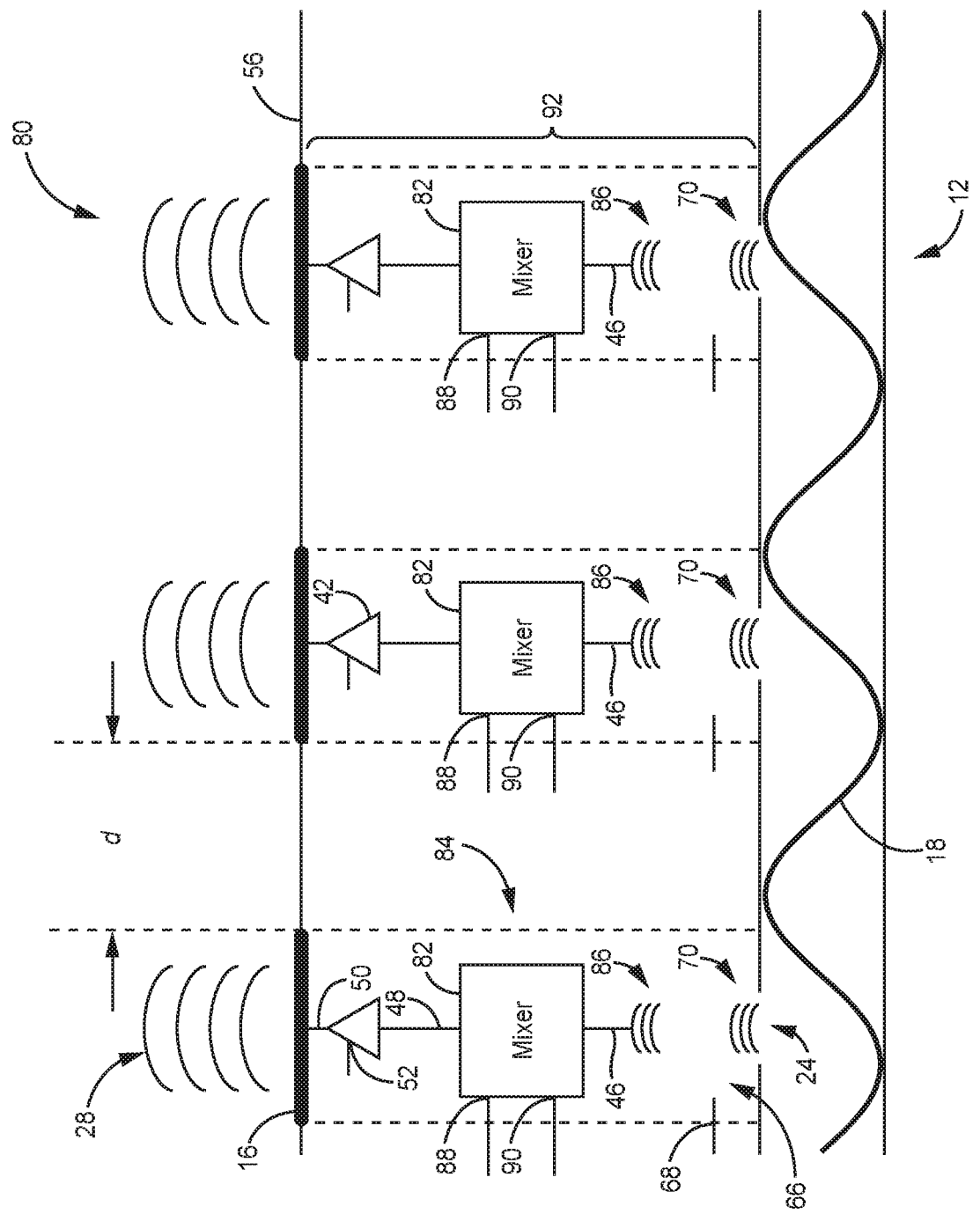
FIG. 4 is a cutaway side view of a waveguide-backed MSAT including distributed controllable signal amplifiers, controllable signal couplers, and controllable signal mixers, according to an embodiment.

FIG. 4 is a cutaway side view of a waveguide-backed MSAT array 80, which is similar to the MSAT array 60 of FIG. 3 except that signal mixers 82 are each disposed between a respective probe 46 and a respective amplifier 42, according to an embodiment; furthermore, components in FIG. 4 common to FIG. 1, FIG. 2, or FIG. 3 are labeled with like reference numbers. The mixers 82 allow the antenna elements 16 to radiate elemental signals 28 having frequencies that are different from each other and from the frequency of the reference wave 18; allowing varying of the frequencies of the elemental signals can provide the MSAT array 80 with another variable for generating beam patterns and for steering main transmission beams.

The signal couplers 84 of the MSAT array 80 are similar to the signal couplers 64 of the MSAT array 60 of FIG. 3, except that each signal coupler 84 includes a respective mixer 82 configured to generate an intermediate signal, and to provide the intermediate signal to an input node 48 of a respective amplifier 42.

As stated above, each signal mixer 82 is coupled between a corresponding probe 46 and an input node 48 of a corresponding amplifier 42. The coupling region 66, or a combination of two or more of the iris 24, coupling region 66, and input impedance of the mixer 82, is configured to form a circuit having a resonant frequency that is approximately equal to the frequency of the reference wave 18. The coupling region 66 is configured to generate, at the probe 46 in response to the iris signal 70, a modified iris signal 86 by attenuating or phase-shifting the iris signal in response to a phase-control signal on the phase-control node 68.

Each mixer 82 includes a control node 88, which is configured to receive a mixer-control signal from a control circuit (not shown in FIG. 4), and a mixing-signal node 90, which is configured to receive a mixing signal, for example, a sinusoidal signal, from the control circuit or from a signal generator (not shown in FIG. 4). The mixer 82 can be any suitable signal mixer, such as a balanced mixer, an unbalanced mixer, or a Gilbert cell.

In response to a control circuit (not shown in FIG. 4) generating, on the control node 88, the mixer-control signal having a "active" state, the mixer 82 is configured to mix the mixing signal on the node 90 with the modified iris signal 86, and to generate, at the amplifier input node 48, an intermediate signal having a frequency that is approximately equal to a sum of, or to a difference between, the frequency of the reference wave 18 and the frequency of the mixing signal. For example, if the reference wave 18 has a frequency of 700 MHz and the mixing signal has a frequency of 500 MHz, then the mixer 82 is configured to generate, on the amplifier input node 48, an intermediate signal having a frequency of either approximately 1200 MHz or approximately 200 MHz. The mixer 82 can be configured to provide one of these frequencies to the input node 48. For example, the mixer 82 can be configured always to provide the lowest frequency, or always to provide the highest frequency. Or the mixer 82 can be programmed, via the mixer-control signal on the node 88, to provide one of the highest and lowest frequencies under some conditions and another of the highest and lowest frequencies under other conditions.

And in response to the control circuit (not shown in FIG. 4) generating, on the control node 88, the mixer-control signal having an "inactive" state, the mixer 82 is configured to provide no signal to the amplifier input node 48, effectively turning "off" an antenna unit 92 to which the mixer belongs (each antenna unit 92 includes a corresponding antenna element 16, iris 24, amplifier 42, probe 46, coupling region 66, and mixer 82).

Allowing a control circuit (not shown in FIG. 4) to adjust the frequencies of the elemental signals 28 relative to the frequency of the reference wave 18 introduces another parameter that the control circuit can alter for generating beam patterns and for steering one or more main transmission beams. The addition of this parameter can increase the number of beam patterns that the control circuit can cause the antenna elements 16 to generate, and, therefore, can increase the resolution with which the control circuit can steer one or more main beams generated by the radiating antenna elements 16.

Still referring to FIG. 4, operation of the MSAT array 80 is described, according to an embodiment. Although operation of one antenna unit 92 is described, it is understood that others of the antenna units can be configured to operate in a similar fashion. Furthermore, the reference wave 18 can have any suitable power level (e.g., ≤250 Watts (W)) at the input port (not shown in FIG. 4) to the transmission structure 12.

The iris 24 of an antenna unit 92 generates an iris signal 70 in response to the reference wave 18.

The coupling region 66 generates a modified iris signal 86 at the probe 46 by shifting the phase of the iris signal 70 in response to the phase-control signal that the control circuit (not shown in FIG. 4) generates on the impedance-control node 68; the phase shift of the modified iris signal relative to the iris signal and to the reference wave 18 can be positive, negative, or zero.

In response to the control circuit (not shown in FIG. 4) generating, on the mixer-control node 88, a mixing-control signal having an "active" state, the mixer 82 mixes the modified iris signal 86 and the mixing signal on the mixing-signal node 90, and generates, at the amplifier input node 48, the intermediate signal having a frequency equal to the sum of, or a difference between, the frequencies of the modified iris signal and the mixing signal (the modified iris signal has approximately the same frequency as the reference wave 18).

The amplifier 42 generates an amplified intermediate signal on the amplifier output node 50 by amplifying the intermediate signal on the amplifier input node 48 in response to the gain-control signal that the control circuit (not shown in FIG. 4) generates on the gain-control node 52; the gain with which the amplifier amplifies the intermediate signal can be greater than one, less than one, or one.

The antenna element 16 radiates an elemental signal 28 in response to the amplified intermediate signal from the amplifier 42, wherein the elemental signal has approximately the same frequency as the intermediate signal.

Other active antenna units 92 operate in a similar manner to generate respective other elemental signals 28.

The control circuit (not shown in FIG. 4) can deactivate one or more of the other antenna units 92 by generating, on the gain-control nodes 52 of the amplifiers 42, respective signals that cause the corresponding amplifiers to have gains of approximately zero.

Alternatively, the control circuit (not shown in FIG. 4) can deactivate one or more of the other antenna units 92 by generating, on the respective phase-control nodes 68, phase-control signals that shift the resonant frequencies of the corresponding coupling regions 66 to frequencies at which the coupling regions significantly attenuate the respective iris signals 70.

Or, the control circuit (not shown in FIG. 4) can deactivate one or more of the antenna units 92 by generating, on the respective mixer-control nodes 88, mixer-control signals having "inactive" levels.

In a further alternative, the control circuit (not shown in FIG. 4) can deactivate one or more of the antenna units 92 by performing two or more of the three previously described antenna-unit-deactivating functions.

The elemental signals 28 generated by the antenna elements 16 of the active ones of the antenna units 92 interfere with one another to form a beam pattern that corresponds to the gain and phase patterns of the antenna units.

Next, the control circuit (not shown in FIG. 4) causes the MSAT array 80 to steer one or more main beams generated by the active ones of the antenna elements 16 by sequencing the antenna units 92 through different gain and phase patterns in the manner described above.

Still referring to FIG. 4, alternate embodiments of the MSAT array 80 are contemplated. For example, although signal coupler 84 and each antenna unit 92 are described as including a mixer 82, each of one or more of the couplers and antenna units may lack a mixer, and, therefore, may be similar to the couplers 64 and antenna units 62 of FIG. 3. Moreover, embodiments and alternate embodiments described in conjunction with FIGS. 1-3 and 5-21 may be applicable to the MSAT array 80.

Figure 5:
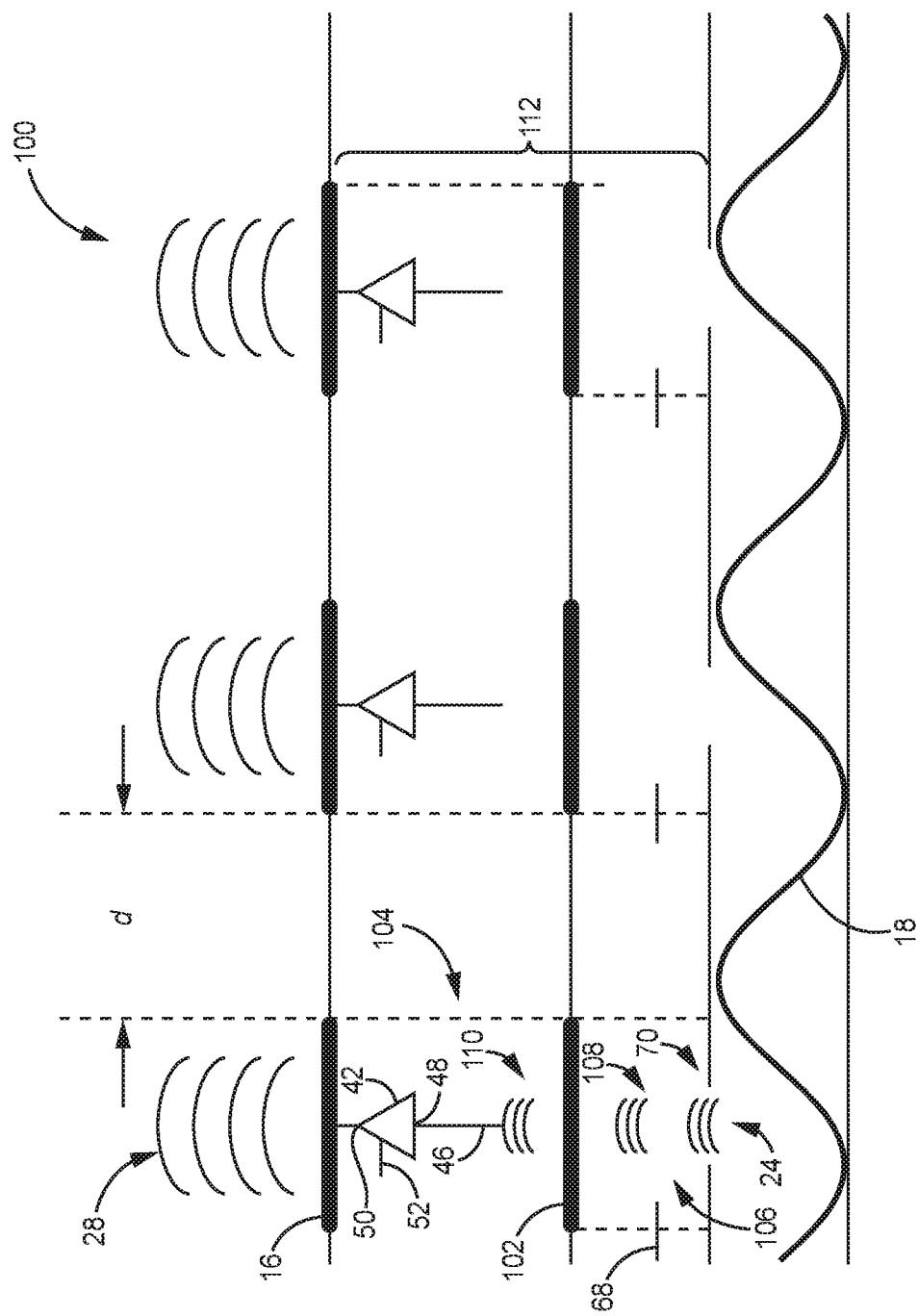
FIG. 5 is a cutaway side view of a waveguide-backed MSAT including distributed controllable signal amplifiers, and controllable signal couplers with radiating elements, according to an embodiment.

FIG. 5 is a cutaway side view of a waveguide-backed MSAT array 100, which is similar to the MSAT array 80 of FIG. 4 except that intermediate radiators 102 are each disposed between a respective iris 24 and a respective probe 46 as part of signal couplers 104, according to an embodiment; furthermore, components in FIG. 5 common to one or more of FIGS. 1-4 are labeled with like reference numbers.

The signal couplers 104 of the MSAT array 100 are similar to the signal couplers 64 of the MSAT array 60 of FIG. 3 except that each coupler 104 also includes a respective intermediate radiator 102, which is disposed between a corresponding iris 24 and a corresponding probe 46. A coupling region 106, or a combination of two or more of the iris 24, intermediate radiator 102, and coupling region 106, is configured to form a circuit having a resonant frequency that is approximately equal to the frequency of the reference wave 18. The coupling region 106 is configured to generate, at the intermediate radiator 102 and in response to the iris signal 70, a modified iris signal 108 by attenuating or phase-shifting the iris signal 70 in response to a phase-control signal on the phase-control node 68.

Each intermediate radiator 102 is configured to generate, in response to a respective modified iris signal 108, a respective intermediate signal 110. For example, each intermediate radiator 102 can have approximately the same dimensions as, and can be otherwise approximately similar to, a corresponding antenna element 16. For example, each intermediate radiator 102 can be configured to generate a respective intermediate signal 110 having one or more parameters (e.g. an electric field) that are altered relative to the same one or more parameters of the iris signal 70 such that the intermediate signal is better suited than the iris signal 70 for reception by the probe 46.

Still referring to FIG. 5, operation of the MSAT array 100 is described, according to an embodiment. Although operation of one antenna unit 112 is described, it is understood that others of the antenna units can be configured to operate in a similar fashion (an antenna unit 112 includes an antenna element 16, a corresponding iris 24, a corresponding amplifier 42, a corresponding probe 46, a corresponding intermediate radiator 102, and a corresponding coupling region 106). Furthermore, the reference wave 18 can have any suitable power level (e.g., ≤250 Watts (W)) at the input port (not shown in FIG. 5) to the transmission structure 12.

The iris 24 of an antenna unit 112 generates an iris signal 70 in response to the reference wave 18.

The coupling region 106 generates a modified iris signal 108 at the intermediate radiator 102 by shifting the phase of the iris signal 70 in response to the phase-control signal that the control circuit (not shown in FIG. 5) generates on the impedance-control node 68; the phase shift of the modified iris signal relative to the iris signal and to the reference wave 18 can be positive, negative, or zero.

The intermediate radiator 102 generates an intermediate signal 110, and radiates the intermediate signal toward the probe 46, which receives the intermediate signal and couples the intermediate signal to the amplifier input node 48 of the amplifier 42.

The amplifier 42 generates an amplified intermediate signal on the amplifier output node 50 by amplifying the intermediate signal 110 on the amplifier input node 48 in response to the gain-control signal that the control circuit (not shown in FIG. 5) generates on the gain-control node 52; the magnitude of the gain with which the amplifier amplifies the intermediate signal can be greater than one, less than one, or one.

The antenna element 16 radiates an elemental signal 28 in response to the amplified intermediate signal from the amplifier 42, wherein the elemental signal has approximately the same frequency as the intermediate signal 110, which has approximately the same frequency as the reference wave 18.

The antenna elements 16 of respective other active antenna units 112 operate in a similar manner to generate respective other elemental signals 28.

The control circuit (not shown in FIG. 5) can deactivate one or more of the other antenna units 112 by generating, on the gain-control nodes 52 of the amplifiers 42, respective signals that cause the corresponding amplifiers to have gains of approximately zero.

Alternatively, the control circuit (not shown in FIG. 5) can deactivate one or more of the other antenna units 112 by generating, on the respective phase-control nodes 68, phase-control signals that shift the resonant frequencies of the corresponding coupling regions 106 to frequencies at which the coupling regions significantly attenuate the respective iris signals 70.

In a further alternative, the control circuit (not shown in FIG. 5) can deactivate one or more of the antenna units 112 by performing both of the two previously described antenna-unit-deactivating functions.

The elemental signals 28 generated by the antenna elements 16 of the active ones of the antenna units 112 interfere with one another to form a beam pattern that corresponds to the gain and phase patterns of the antenna units.

Next, the control circuit (not shown in FIG. 5) causes the MSAT array 100 to steer one or more main beams generated by the active ones of the antenna elements 16 by sequencing the antenna units 112 through different gain and phase patterns in the manner described above.

Still referring to FIG. 5, alternate embodiments of the MSAT array 100 are contemplated. For example, although each antenna unit 100 is described as including an intermediate radiator 102, each of one or more of the antenna units may lack an intermediate radiator, and, therefore, may be similar to the antenna units 62 of FIG. 3. Moreover, embodiments and alternate embodiments described in conjunction with FIGS. 1-4 and 6-21 may be applicable to the MSAT array 100.

Figure 6:
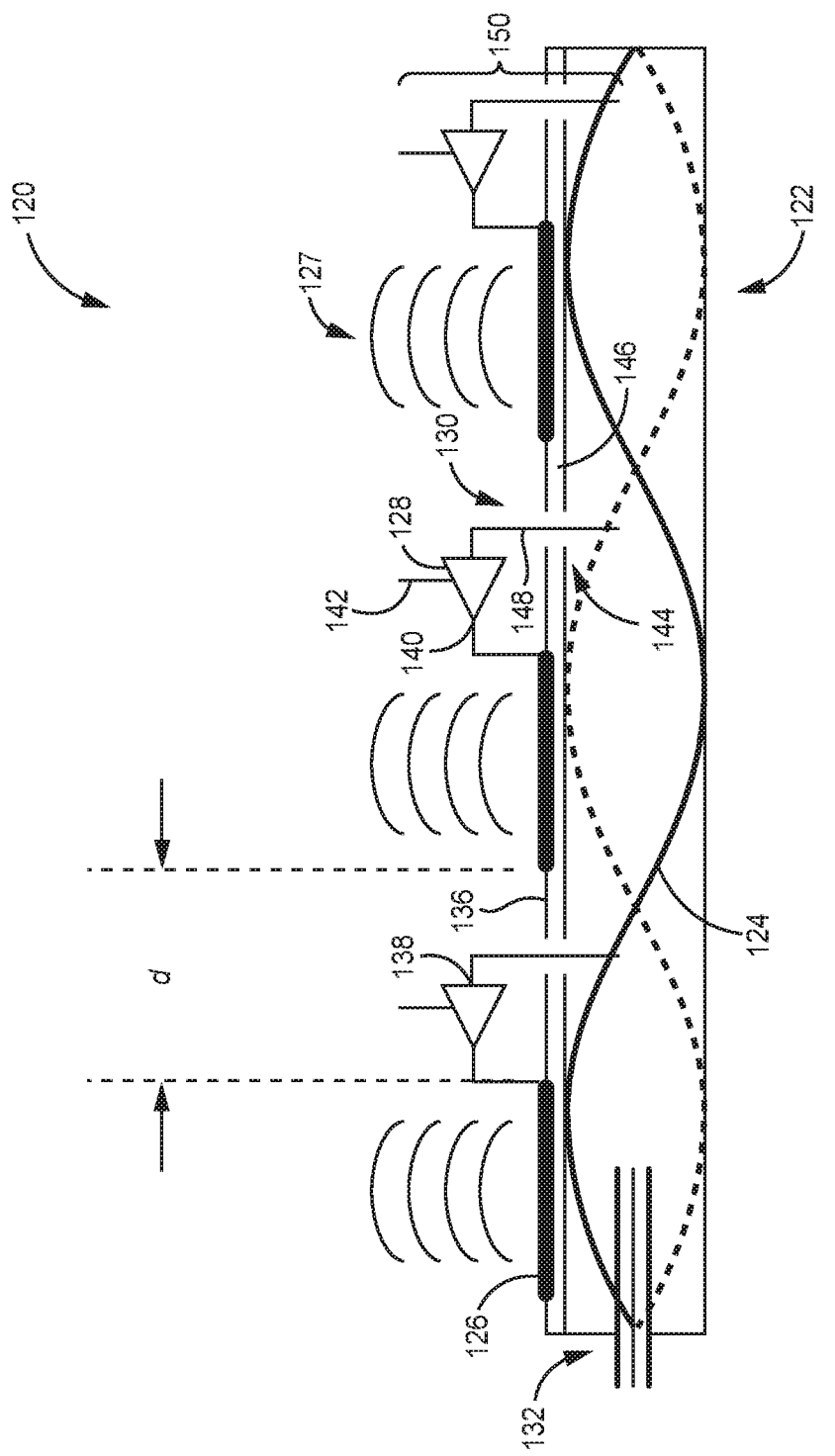
FIG. 6 is a cutaway side view of a cavity-backed MSAT including distributed controllable signal amplifiers, according to an embodiment.

FIG. 6 is a cutaway side view of a cavity-backed MSAT array 120, which is configured to generate a transmission beam having a power that is significantly higher than the power of a transmission beam that the MSAT array 10 of FIG. 1 is configured to generate, according to an embodiment.

A significant difference between the cavity-backed array 120 and the waveguide-backed arrays 40, 60, 80, and 100 of FIGS. 2-5, respectively, is that the cavity-backed array includes a cavity 122 instead of the transmission medium 12. From an operational perspective, the cavity 122 facilitates generation of one or more standing reference waves 124, whereas the transmission medium 12 facilitates generation of the propagating reference wave 18.

As described in more detail below, the cavity 122 can facilitate shifting the phase of the standing reference wave 124 for an antenna element 16 in a different, and sometimes in a more cost-effective and more space-effective, manner than can the transmission medium 18 (FIGS. 2-5).

In addition to the cavity 122, the cavity-backed MSAT array 120 includes antenna elements 126, amplifiers 128, and signal couplers 130.

The cavity 122 is, effectively, a bounded waveguide, and includes an input port 132, which is configured to receive an input signal that excites the cavity 122 to generate the standing reference wave 124. The boundaries (e.g., conductive walls) of the cavity 122 are configured to reflect energy at the frequency of the input signal, and the standing reference wave 124 results from the interference pattern of the reflected energy. Because the reference wave 124 is a standing wave, between any two arbitrary points in the cavity 122 there is a time-invariant phase difference assuming no changes to the standing wave. Furthermore, the input port 132 can be any suitable type of signal port; for example, the input port can be a coaxial-cable input port.

The antenna elements 126 are patch antenna elements that are formed on a surface 136 of the array 120 over the cavity 122, that are each configured to radiate a respective elemental signal 127, and that can be similar in structure and function to the antenna elements 16 of FIGS. 2-5. Because the phase difference of the reference wave 124 between any two antenna elements 126 is time-invariant, the lattice constant (l+d) of the antenna array 120 is $(l+d) << \lambda_o/2$, where $\lambda_o$ is the free-space wavelength of the standing reference wave 124, and is approximately the wavelength of the elemental signals 127. For example, $(l+d) \approx \lambda_o/10$. A reason for the lattice constant (l+d) being much less than $\lambda_o/2$ is that because the MSAT antenna array 120 includes no phase shifters, the antenna elements 126 are positioned close enough together, and are made small enough, to sample different relative phases of the reference wave 124, which itself may have a wavelength $\lambda_{TS}$ that is much shorter than $\lambda$. Although the lattice constant (l+d) shown in FIG. 6, and in at least some of the other figures, is approximately equal to $\lambda_{TS}$, it is understood that an embodiment of the antenna array 120, and embodiments of one or more of the antenna arrays described above and below, can have lattice constants (l+d) that are significantly different than $\lambda_{TS}$.

The amplifiers 128 can be similar to the amplifiers 42 of FIGS. 2-5, and are located, arranged, distributed, and otherwise configured, to prevent damage to the array 120 while the array is generating a higher-power (e.g., ≥1.0 kW) transmission beam. For example, one or more of the amplifiers 128 are respective surface-mount amplifiers that are mounted to the surface 136 over the cavity 122, and are configured to distribute power generation, and, therefore, to distribute heat generation, over a relatively large region of the array 120 to prevent the generation of "hot spots" having temperatures high enough to damage the array.

Each amplifier 128 includes an input node 138, an output node 140 coupled to a respective antenna element 126, and a control node 142, which is configured to allow a control circuit (not shown in FIG. 6) to control the gain of the amplifier in a binary, gray-scale (digital), or continuous (analog) manner. Furthermore, although shown as being coupled to an edge of the antenna element 126, the output node 140 can be coupled to any suitable location of the antenna element. For example, a designer can select the coupling location to provide a desired coupling impedance. Moreover, although not shown, each amplifier 128 includes a power connection.

The signal couplers 130 each include a respective iris 144 disposed in an upper boundary (e.g., a conductive wall) 146 of the cavity 122, and a respective probe 148, which extends through the respective iris and into the cavity. The iris 144, the probe 148, or the combination of the iris and the probe, is configured to generate, from the standing reference wave 124, an intermediate signal having approximately the same frequency, phase, and amplitude of the standing reference wave at the location of the signal coupler 130, and the probe is configured to couple the intermediate signal to the input node 138 of a respective amplifier 128 that corresponds to the coupler. The iris 144 can have any suitable dimensions, shape, and other characteristics, as can the probe 148. Furthermore, the iris 144, the probe 148, or the combination of the iris and the probe, can be configured to impart, to the intermediate signal, a phase shift, attenuation, or both a phase shift and attenuation, relative to the standing reference wave 124 at the location of the signal coupler 130.

Still referring to FIG. 6, operation of the MSAT array 120 is described, according to an embodiment. Although operation of one antenna unit 150 is described (an antenna unit 150 includes a respective iris 144, a corresponding probe 148, a corresponding amplifier 128, and a corresponding antenna element 126), it is understood that others of the antenna units can be configured to operate in a similar fashion. Furthermore, the standing reference wave 124 can have any suitable power level (e.g., ≤250 Watts (W), such as from a few hundred mW to tens of W) at the input port 132 to the cavity 122.

The signal coupler 130 converts a portion of the reference wave 124 received by the probe 148 into an intermediate signal, and provides the intermediate signal to the input node 138 of the amplifier 128.

The amplifier 128 generates an amplified intermediate signal on the amplifier output node 140 by amplifying the intermediate signal on the amplifier input node 138 in response to the gain-control signal that the control circuit (not shown in FIG. 6) generates on the gain-control node 142; the magnitude of the gain with which the amplifier amplifies the intermediate signal can be greater than one, less than one, or one.

The antenna element 126 converts the amplified intermediate signal into the elemental signal 127, and radiates the elemental signal.

Other active antenna units 152 operate in a similar manner to generate respective other elemental signals 127.

The control circuit (not shown in FIG. 6) can deactivate one or more of the other antenna units 150 by generating, on the gain-control nodes 142, respective signals that cause the corresponding amplifiers 128 to have gains of approximately zero.

The elemental signals 127 radiated by the active ones of the antenna elements 126 interfere with one another to form a beam pattern that corresponds to the gain and phase patterns of the antenna units.

Next, the control circuit (not shown in FIG. 6) causes the MSAT 120 to steer one or more main beams generated by the active ones of the antenna elements 126 by sequencing the antenna units 150 through different gain patterns in the manner described above.

Still referring to FIG. 6, alternate embodiments of the cavity-backed MSAT array 120 are contemplated. For example, although described as being located on or over the upper surface 136, one or more of the amplifiers 128 can be located elsewhere in or on the MSAT array 120. Furthermore, although each antenna unit 150 is described as including a respective amplifier 128, one or more of the antenna units may lack an amplifier such that the respective probes 148 each directly contacts a respective antenna element 126. Furthermore, although shown as having a single row of antenna units 150, the cavity-backed MSAT array 120 may have multiple rows of antenna units arranged in a rectangular pattern or in a pattern of another shape. Moreover, although the antenna units 150 are described as being arranged in a two-dimensional array, they may be arranged in a one-dimensional or three-dimensional array. In addition, although described as including a single cavity 122, the MSAT array 120 may include multiple cavities, for example, one cavity per row of antenna units 150. Furthermore, although described as being three-dimensional, the cavity 122 can be two-dimensional. Moreover, although described as being on the same side (i.e., the top) of the cavity 122, one or more of the antenna elements 126 and amplifiers 128 can be disposed on different ones of the sides of the cavity. In addition, embodiments and alternate embodiments described in conjunction with FIGS. 1-5 and 7-21 may be applicable to the MSAT array 120.

Figure 7:
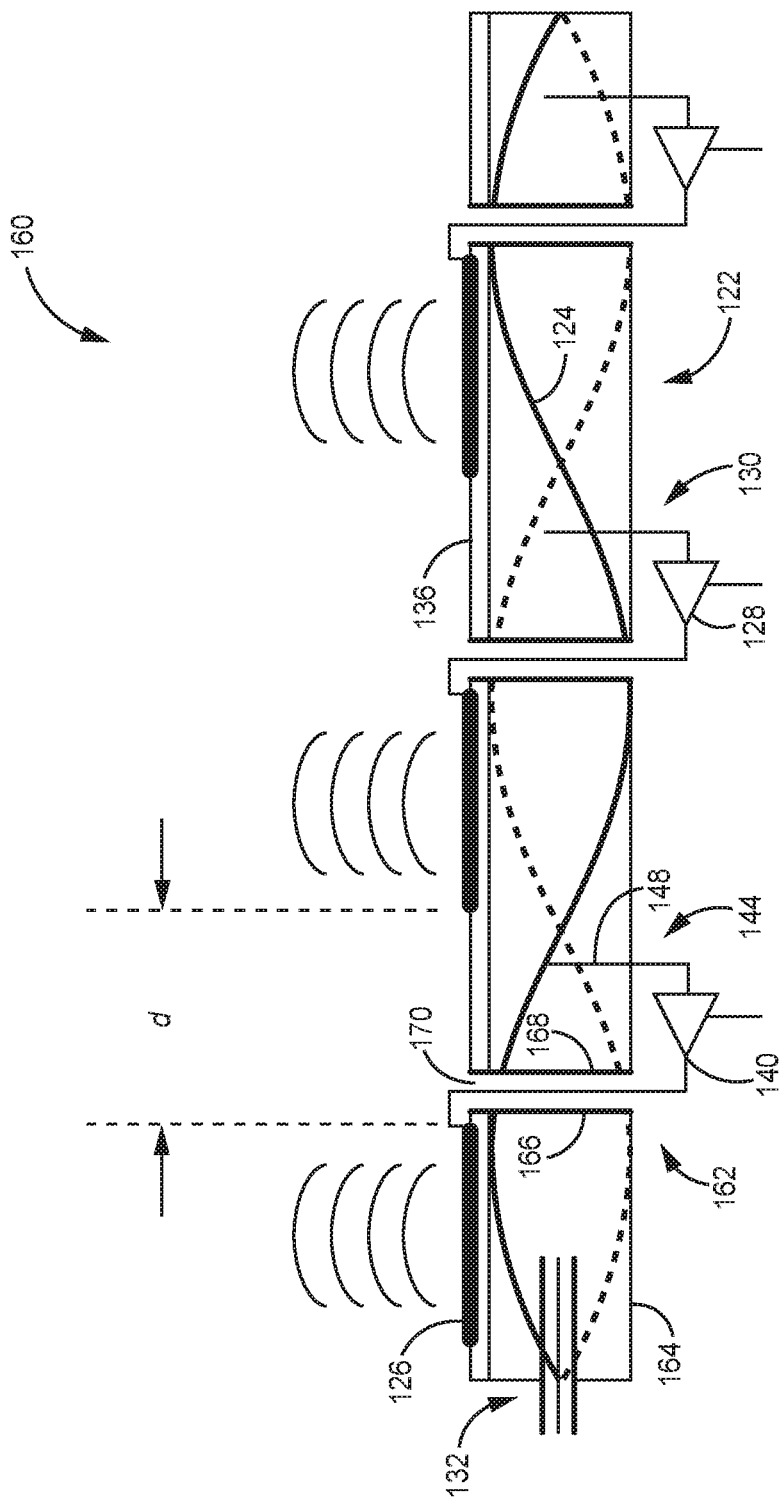
FIG. 7 is a cutaway side view of a cavity-backed MSAT including distributed controllable signal amplifiers disposed on sides of the cavity other than the side on which the antenna elements are disposed, according to another embodiment.

FIG. 7 is a cutaway side view of a cavity-backed MSAT array 160, which is configured to generate a transmission beam having a power that is significantly higher than the power of a transmission beam that the MSAT array 10 of FIG. 1 is configured to generate, according to an embodiment; furthermore, components in FIG. 7 common to FIG. 6 are labeled with like reference numbers.

A significant difference between the cavity-backed MSAT array 160 and the cavity-backed MSAT array 120 of FIG. 6 is that at least some of the amplifiers 128 are disposed on, or over, one or more sides (e.g., bottom, vertical sides) of the cavity 122 other than the top side. Disposing one or more of the amplifiers 128 on, or over, one or more sides of the cavity 122 can reduce the component and wiring-trace density on the top surface 136 of the array 160.

Formed in the cavity 122 are vias 162, each via extending through the cavity 122, from a side on, or over, which a respective amplifier 128 is disposed, to the top surface 136 (only vias extending from a bottom surface 164 of the cavity to the top surface 136 are shown in FIG. 7).

The output node 140 of each not-top-mounted amplifier 128 is coupled to a corresponding antenna element 126 via a respective one of the vias 162. For example, each of the vias 162 can be, or can include, a respective coaxial transmission structure having a center conductor 166 coupled to and between the amplifier output node 140 and the antenna element 126, and having an outer conductor 168 configured for coupling to a reference voltage such as ground. A space 170 between the center and outer conductors 166 and 168 can be filed with any suitable dielectric material. Furthermore, respective impedance-matching networks (not shown in FIG. 7) can be included at the ends of each via 162 to match the impedance at the amplifier output node 140 with the input impedance of the via, and to match the output impedance of the via with the input impedance of the antenna element 126 at the location of the antenna element at which the signal from the via feeds the antenna element.

The irises 144 are formed in the sides of the cavity 122 on, or over, which the amplifiers 128 are respectively disposed. For example, as shown in FIG. 7, at least some of the signal couplers 130 (i.e., the combination of an irises 144 and a corresponding probe 148) are formed along the bottom side 164 of the cavity 122.

Furthermore, the vias 162 can be configured "to disturb" the reference wave 124; that is, the vias can affect the phase and amplitude of the reference wave at one or more locations of the cavity 122. Therefore, a designer can strategically place one or more of the vias 162 to impart to the reference wave 124 a predictable phase or amplitude at each of one or more locations of the cavity 122.

Still referring to FIG. 7, the MSAT array 160 can operate similarly to the MSAT array 120 of FIG. 6, according to an embodiment.

Alternate embodiments of the cavity-backed MSAT array 160 are contemplated. For example, embodiments and alternate embodiments described in conjunction with FIGS. 1-6 and 8-21 may be applicable to the MSAT array 160.

Figure 8:
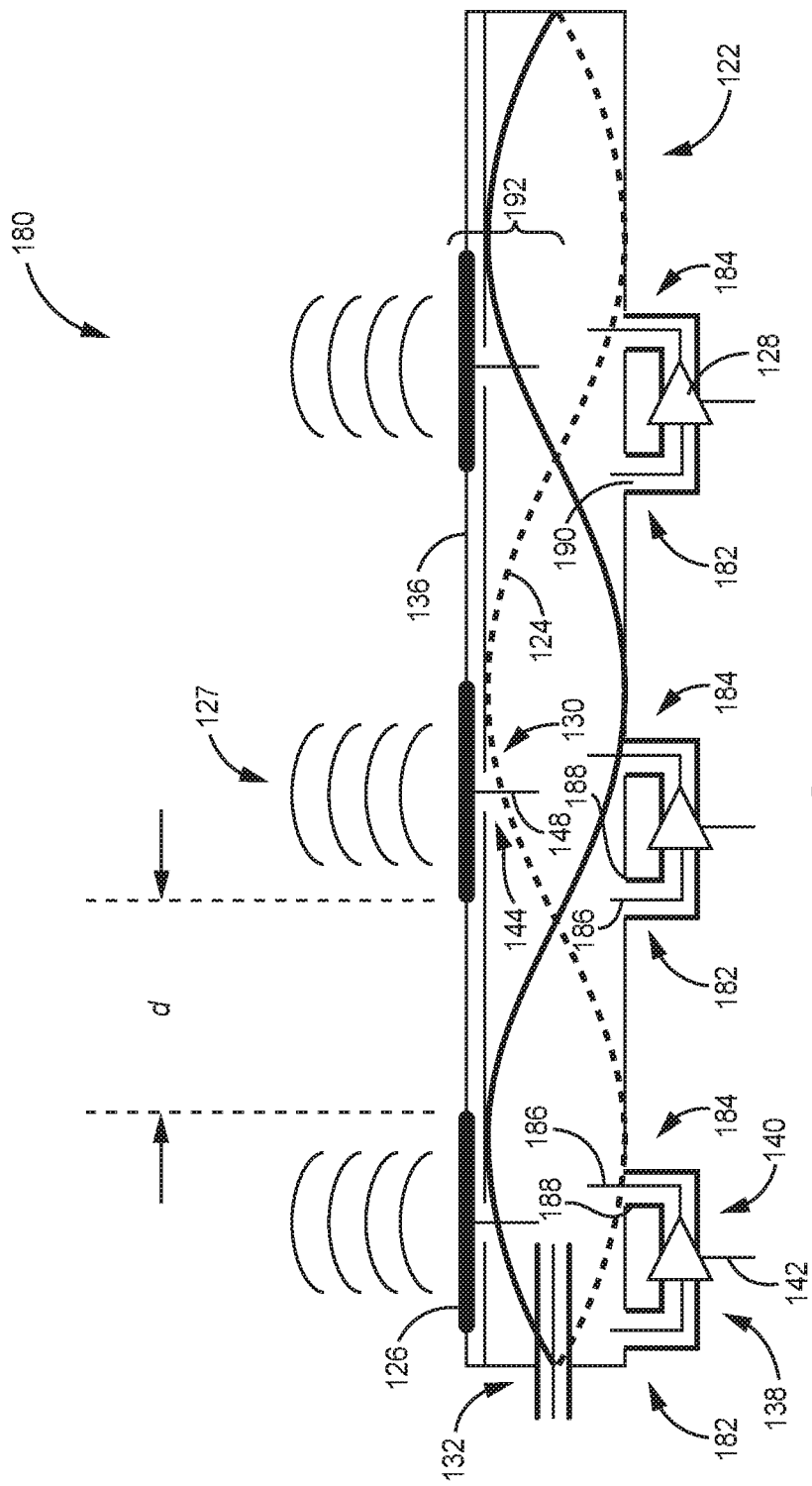
FIG. 8 is a cutaway side view of a cavity-backed MSAT including distributed controllable signal amplifiers that amplify the reference wave in the cavity, according to yet another embodiment.

FIG. 8 is a cutaway side view of a cavity-backed MSAT array 180, which is configured to generate a transmission beam having a power that is significantly higher than the power of a transmission beam that the MSAT array 10 of FIG. 1 is configured to generate, according to an embodiment; furthermore, components in FIG. 8 common to FIGS. 6-7 are labeled with like reference numbers.

A significant difference between the cavity-backed MSAT array 180 and the cavity-backed waveguide 160 of FIG. 7 is that instead of driving a respective antenna element 126 with an amplified intermediate signal, at least some of the amplifiers 128 are configured to add power to, and otherwise to reinforce, the reference wave 124 in the cavity 122 at respective locations within the cavity. Such an amplifier configuration spatially distributes power amplification to the reference wave 124 instead of directly to the antenna elements 126; consequently, the power of the reference wave 124 at the input port 132 can be as low as a few mW to a few hundred mW. Furthermore, as in the waveguide 160 of FIG. 7, one or more of the amplifiers 128 can be disposed on, or over, sides of the cavity other than the top side to reduce the component and wiring-trace density on the top surface 136 of the antenna array 180.

In addition to the reference-wave input port 132, the cavity 122 includes one or more amplifier-output ports 182, and one or more amplifier-input ports 184. For example, the ports 182 and 184 can be coaxial ports each having a respective inner conductor 186, a respective outer conductor 188, and a respective dielectric region 190. And each inner conductor 186 can extend into the cavity 122 and act as a respective probe. Furthermore, respective impedance-matching networks (not shown in FIG. 8) can be included at each of the input and output ports to match the cavity impedance to the input impedance of an output port 182, to match the input impedance of the amplifier 128 with the output impedance of the output port 182, to match the output impedance of the amplifier with the input impedance of the input port 184, and to match the cavity impedance to the output impedance of the input port 184.

Ideally, the phase shift imparted by each amplifier 128 is set so that the signal that the amplifier generates on the respective inner conductor 186 coupled to the amplifier's output node 140 is approximately in phase with the reference wave 124 at the inner conductor of the respective amplifier-input port 184. If the amplifier's output signal is significantly out of phase with the reference wave 124 at the respective amplifier-input port 184, then the phase, frequency, or amplitude of the reference wave, at the respective amplifier-input port, can change from the value expected in view of the phase and frequency of the reference wave 124 at the cavity-input port 132.

As described above in conjunction with FIGS. 6-7, each antenna element 126 has approximately a length l, and each pair of immediately adjacent antenna elements is separated by approximately a distance d, such that a lattice constant (l+d) of the antenna elements is (l+d)<<$\lambda_o$/2, where $\lambda_o$ is the free-space wavelength of the reference wave 18 and is approximately the wavelength of the elemental signals 127. For example, (l+d) ≈$\lambda_o$/10.

The iris 144, the probe 148, or the combination of the iris and the probe, of each signal coupler 130 is configured to generate a respective intermediate signal, and to provide the intermediate signal directly to the antenna element 126. Because the reference signal 124 is spatially reinforced, i.e., amplified, within the cavity 122, each intermediate signal has a higher power level than it would have in the absence of the amplifiers 128.

Still referring to FIG. 8, the operation of the MSAT array 180 is described, according to an embodiment.

A reference-wave generator (not shown in FIG. 8) generates an input signal at the cavity-input port 132, and the cavity 122 converts the input signal into the standing reference wave 124.

Each amplifier 128 configured as a reference-wave-reinforcing amplifier receives, at its input node 138, the reference wave 124 from the cavity 122 via a respective amplifier-input port 182, amplifies the reference wave, and couples the amplified reference wave back into the cavity 122 via its output node 140 and a respective amplifier-output port 184. A control circuit (not shown in FIG. 8) sets the gain with which the amplifier 128 amplifies the reference wave 124 via the respective control node 142 of the amplifier. By controlling the gains of the amplifiers 128, the control circuit controls the amplitudes of the reference wave 124 at the signal couplers 130, and, therefore, controls the amplitudes of the elemental signals 127.

The iris 144, probe 148, or the combination of the iris and the probe, of the respective signal coupler 130 generates, from the reference wave 124 at the probe, an intermediate signal having approximately the same phase and the same frequency as the reference wave, and the probe couples the intermediate signal to a respective antenna element 126.

If it is active, then the antenna element 128 converts the intermediate signal from the probe 148 into an elemental signal 127, and radiates the elemental signal, which has approximately the same phase and the same frequency as the intermediate signal. If the antenna element 126 is inactive, it does not radiate an elemental signal 127 (or radiates an elemental signal having negligible power).

Other active antenna units 192 operate in a similar manner to generate respective other elemental signals 127 (an antenna unit 192 includes a signal coupler 130 and a corresponding antenna element 126).

The control circuit (not shown in FIG. 8) can deactivate one or more of the other antenna units 192 by generating, on switches (not shown in FIG. 8), respective signals that inhibit the corresponding antenna elements 126 from radiating elemental signals 127.

The elemental signals 127 radiated by the active ones of the antenna elements 126 interfere with one another to form a beam pattern that corresponds to the gain and phase patterns of the antenna units.

Next, the control circuit (not shown in FIG. 8) causes the MSAT array 180 to steer one or more main beams generated by the active ones of the antenna elements 126 by sequencing the antenna units 192 through different gain patterns in the manner described above.

Still referring to FIG. 8, alternate embodiments of the cavity-backed MSAT array 180 are contemplated. For example, by varying the gains of the amplifiers 128 configured to reinforce the standing reference wave 124, a control circuit (not shown in FIG. 8) can adjust not only the local amplitudes of the reference wave, but also can adjust the local phases of the standing reference wave, and thus can adjust the phase of at least one elemental signal 127 relative to at least one other elemental signal; the ability to adjust the relative phases of one or more elemental signals can allow a designer to increase the lattice constant (l+d) toward the theoretical limit of $\lambda_o/2$, where $\lambda_o$ is approximately the wavelength of the elemental signals 127 and is the free-space wavelength of the reference wave 124. Herein, the "theoretical limit" of the lattice constant means the maximum lattice constant that does not cause an antenna array, such as the antenna array 180, to produce artifacts such as aliasing. An antenna array, such as the antenna array 180, could, however, have a lattice constant greater than $\lambda_o/2$ if the application in which the antenna array is used can tolerate such artifacts. Furthermore, although shown with a ratio of one amplifier 128 per antenna unit 192, there may be fewer than one amplifier per antenna unit. Moreover, the respective distance between each pair of cavity ports 182 and 184 can have any suitable value, and the distances between the cavity ports 182 and 184 need not be uniform and need not be along a uniform direction. In addition, embodiments and alternate embodiments described in conjunction with FIGS. 1-7 and 9-21 may be applicable to the MSAT array 180.

Figure 9:
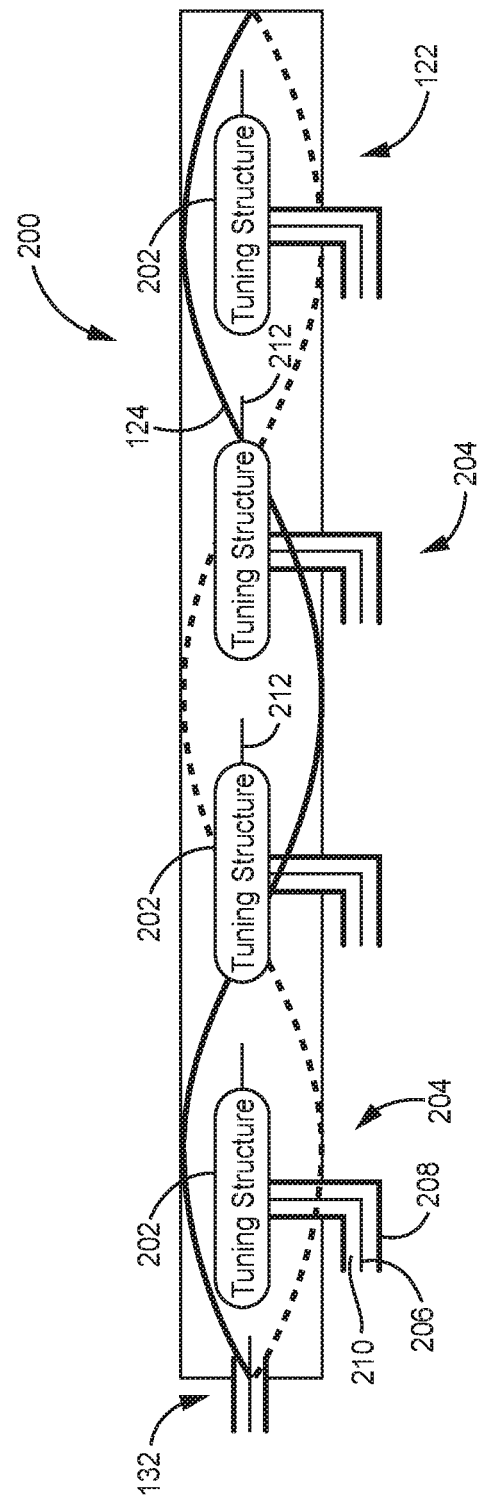
FIG. 9 is a cutaway side view of a tunable cavity of a cavity-backed MSAT, and of distributed cavity-tuning structures disposed inside of the cavity, according to an embodiment.

FIG. 9 is a cutaway side view of a cavity portion 200 of a cavity-backed MSAT array, which is configured to generate a transmission beam having a power that is significantly higher than the power of a transmission beam that the MSAT array 10 of FIG. 1 is configured to generate, according to an embodiment; in FIG. 9, components common to FIGS. 6-8 are labeled with like reference numbers. For example, any of the cavity-backed MSAT arrays 120, 160, and 180 of FIGS. 6-8, respectively, can be modified to incorporate the cavity portion 200.

A significant difference between the cavity portion 200 and the cavity portions of the cavity-backed MSAT arrays 120, 160, and 180 of FIGS. 6-8 is that the cavity 122 includes one or more tuning structures 202, which are each configured to vary the phase of the standing reference wave 124 local to the tuning structure. By varying the local phases of the reference wave 124 with the one or more tuning structures 202, a control circuit (not shown in FIG. 9) can vary, selectively, the relative phases between elemental signals 127 (e.g., FIG. 8) radiated by the antenna elements 126 (e.g., FIG. 8), and, therefore, can steer a transmission beam with a finer resolution than with amplifier gain control alone. Furthermore, the ability to vary the relative phases between elemental signals 127 can allow a designer of the MSAT array to increase the lattice constant (l+d) (e.g., FIG. 8) toward its theoretical limit of $\lambda_o/2$, where $\lambda_o$ is approximately the free-space wavelength of the reference wave 124.

In addition to the cavity input port 132, the cavity 122 includes one or more cavity-tuning input ports 204, which are each configured to receive a respective tuning input signal. For example, the ports 204 can be coaxial ports each having a respective inner conductor 206, a respective outer conductor 208, and a respective dielectric region 210.

Each tuning structure 202 is configured to receive a respective tuning input signal from a respective one of the cavity-tuning input ports 204, and to cause the reference wave 124 to have, in the locality of the tuning structure, a local phase having a value that is set by the characteristics of the respective tuning input signal and a phase-control signal. For example, each tuning structure 202 can include a control node 212 configured to receive a phase-control signal from a control circuit (not shown in FIG. 9). In response to the phase-control signal, the tuning structure 202 is configured to impart a corresponding phase shift to the respective tuning signal that it receives, and it is this phase-shifted tuning signal that reinforces the standing reference wave 124 in the vicinity of the tuning structure. The topologies of the tuning structures 202 are further described below in conjunction with FIGS. 10-12. Furthermore, the characteristics of each tuning input signal can include amplitude, phase, frequency, and modulation. And each phase-control signal can be a binary signal, a grayscale (i.e., a multi-bit digital) signal, or an analog signal.

Still referring to FIG. 9, operation of the cavity portion 200 is described, according to an embodiment.

A signal generator (not shown in FIG. 9) generates, and provides to the input port 132, an input signal having a frequency, phase, and amplitude.

The signal generator (not shown in FIG. 9) also generates, and provides to each of the cavity-tuning input ports 204, a respective tuning signal. Each tuning signal has characteristics, e.g., a frequency, phase, amplitude, or modulation, each of which can be approximately the same as, or different from, the corresponding characteristic of the input signal and of the other tuning signals. For example, one of the tuning signals may have a frequency that is approximately the same as the frequency of the input signal at the port 132 but that is different from the frequency of another tuning signal at another cavity-tuning input port 204. Further in example, the signal generator can modulate (e.g., frequency, phase, or amplitude modulate) each tuning signal in a same manner, or in a different manner, relative to the other tuning signals.

The control circuit (not shown in FIG. 9) controls the signal generator (not shown in FIG. 9) to generate the input and tuning signals, generates respective phase-control signals on the phase-control lines 206, and selectively activates the antenna units (not shown in FIG. 9), in a manner that causes the elemental signals 127 (e.g., FIG. 8) radiated by active ones of the antenna elements 126 (e.g., FIG. 8) to have respective relative phases such that the elemental signals interfere with one another to form a corresponding beam pattern. In response to a respective phase-control signal, each tuning structure 202 shifts the phase of a respective tuning signal by an amount that corresponds to the phase-control signal, and, therefore, causes the reference wave 124, in the location of the tuning structure, to have a corresponding phase. By altering the phase shifts imparted by the tuning structures 202, the control circuit imparts to each of the radiated signals 127 relative phases such that the radiated signals interfere to radiate a corresponding beam pattern.

Next, the control circuit (not shown in FIG. 9) causes a MSAT array that incorporates the cavity portion 200 to steer one or more main beams generated by the active ones of the antenna elements 126 (e.g., FIG. 8) by sequencing the radiated elemental signals 127 (e.g., FIG. 8) through different relative-phase patterns in the manner described above. For example, the control circuit can effect such beam steering by sequentially altering at least one of the following: one or more of the characteristics of the input signal, one or more of the characteristics of one or more of the tuning signals, and one or more of the phase-control signals to alter the respective phases that the tuning structures 202 impart to the tuning signals.

Still referring to FIG. 9, alternate embodiments of the cavity portion 200 are contemplated. For example, although shown as being evenly distributed within the cavity portion 200, the tuning structures 202 can be unevenly distributed within the cavity portion. Furthermore, although shown as receiving a respective tuning signal, each of one or more of the tuning structures 202 can be configured to effect a local phase change in the standing reference wave 124 without receiving a tuning signal; that is, one or more of the tuning structures may not be coupled to an input port 204, or the input port may be coupled to the cavity 122. Moreover, a control circuit (not shown in FIG. 9) can control a signal generator (not shown in FIG. 9) to vary one or more characteristics of the input signal to the input port 132. In addition, the control circuit also can alter the amplitudes of the radiated elemental signals 127 (e.g., FIG. 8) by altering the gains of the amplifiers 128 (e.g., FIG. 8) of a MSAT array that includes the cavity portion 200, or by selectively turning "on" or "off" the antenna elements 126 (e.g., FIG. 8). Furthermore, each of one or more of the tuning structures 202 may include an amplifier having a gain controllable by a control circuit, which may alter the amplitude of one or more of the radiated signals 127 by altering the gain of one of more of these tuning-structure amplifiers. Moreover, the input port 132 can be omitted such that the cavity 122 is excited only via one or more tuning signals input to one or more of the cavity-tuning input ports 204. In addition, the control circuit can control the tuning structures 202 such that the cavity 122 operates as a "chaotic" cavity for which it is difficult to predict the patterns of the standing reference wave 124, and, therefore, for which it is difficult the phases corresponding to the respective antenna elements. With such a chaotic cavity 122, the control circuit, or another circuit, can characterize the respective beam pattern generated by the antenna array for each possible setting of the tuning structures 202 (and of amplifiers and other settable components if included in the array), store descriptions of these beam patterns in a look-up table (LUT), and steer one or more beams by generating a corresponding sequencing of one or more of these beam patterns. Furthermore, the cavity 122, the tuning structures 202, or both the cavity and the tuning structures can be configured to suppress harmonic and other resonant modes in the cavity such that the standing reference wave 124 has a designed-for wavelength at different settings of the tuning structures. Moreover, embodiments and alternate embodiments described in conjunction with FIGS. 1-8 and 10-21 may be applicable to the cavity portion 200.

Figure 10:
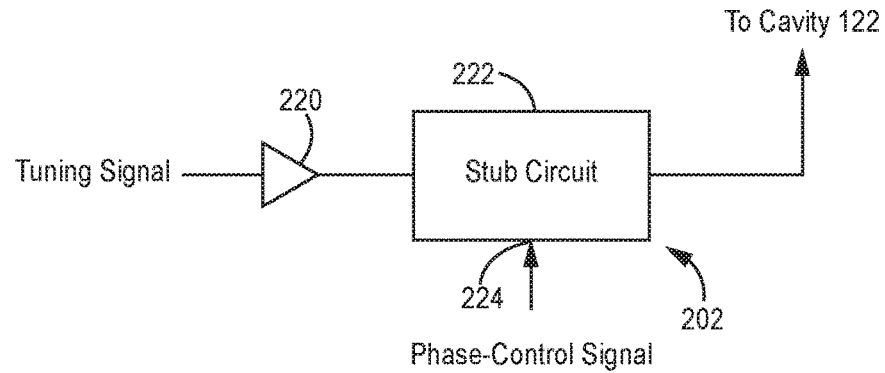
FIG. 10 is a diagram of a tuning structure of FIG. 9, according to an embodiment.

FIG. 10 is a diagram of a tuning structure 202 of FIG. 9, according to an embodiment.

The tuning structure 202 includes an amplifier 220 and a stub circuit 222 having a control node 224. The input impedance of the amplifier 220 can be configured to match the output impedance of a medium (e.g., a coaxial transmission medium) carrying the tuning signal, and the output impedance of the amplifier can be configured to match the input impedance of the stub circuit 222 (or, the input impedance of the stub circuit can be configured to match the output impedance of the amplifier). And the output impedance of the stub circuit 222 can be configured to match the impedance of the location of the cavity 122 that the stub circuit feeds with an output signal.

In operation, the amplifier 220 buffers and amplifies the tuning signal, and provides the amplified tuning signal to the stub circuit 222.

A control circuit (not shown in FIG. 10) generates a phase-control signal on the phase-control node 224, and the stub circuit 222 shifts the phase of the amplified tuning signal in response to the phase-control signal and provides the phase-shifted tuning signal to a location of the cavity 122.

Still referring to FIG. 10, alternate embodiments of the tuning structure 202 are contemplated. For example, the amplifier 220 may have a gain that a control circuit (not shown in FIG. 10) can adjust such that the tuning structure 202 is configured to shift the phase of, and to amplify, the tuning signal. Furthermore, in an embodiment in which the tuning structure 202 receives no tuning signal, the tuning structure can be configured to receive the reference wave 124 (FIG. 9) at a particular location of the cavity 122, to shift the phase of the received reference wave, and to output the phase-shifted reference wave at the same or at another location of the cavity. Moreover, the tuning structure 202 can be any conventional phase shifter or phase-shifting circuit. In addition, the tuning structure 202 may include only the amplifier 220, such that the tuning structures are configured to alter local phases of the reference wave 124 by altering local amplitudes of the reference wave; that is, by altering local amplitudes, the tuning structures are configured to "steer" the cavity mode to yield respective patterns of the standing reference wave. Furthermore, embodiments and alternate embodiments described in conjunction with FIGS. 1-9 and 11-21 may be applicable to the tuning structure 202.

Figure 11:
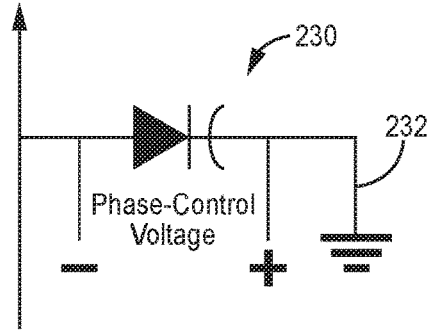
FIG. 11 is a schematic diagram of the stub of FIG. 10 in a short-circuited configuration, according to an embodiment.

FIG. 11 is a diagram of the stub circuit 222 of the tuning structure 202 of FIG. 10, according to an embodiment.

The stub circuit 222 includes a varactor diode 230 configured to shunt the amplified tuning signal from the amplifier 220 to a reference node, or reference conductive plane, 232, which is held at a reference voltage such as ground.

The varactor diode 230 acts as a voltage-controlled capacitor that is coupled between the output of the amplifier 220 (FIG. 10) and the reference node or plane 232.

The phase-control signal, here a phase-control voltage, reverse biases the varactor diode 230 such that little or no zero-frequency (DC) current flows through the diode.

By varying the magnitude of the phase-control voltage, a control circuit (not shown in FIG. 11) can vary the capacitance of the diode 230.

And by varying the capacitance of the diode 230, the control circuit (not shown in FIG. 11) can vary the impedance that the amplified tuning signal "sees," and, therefore, can vary the phase shift that the stub circuit 222 imparts to the amplified tuning signal.

As described above in conjunction with FIG. 10, the stub circuit 222 is configured to provide this amplified and phase-shifted version of the tuning signal to the cavity 122 at a feed location to which the output port of the stub circuit is coupled.

In operation, a control circuit (not shown in FIG. 11) generates, across the varactor diode 230, the phase-control voltage having a magnitude and having a phase that reverse biases the diode.

In response to the phase-control voltage, the reverse-biased varactor diode 230 presents, to the amplified tuning signal from the amplifier 220 (FIG. 10), a capacitance having a magnitude that corresponds to the magnitude of the phase-control voltage.

The capacitance of the varactor 230 shunts a portion of the amplified tuning signal to the reference node or conductive plane 232, and imparts a phase shift to the portion of the amplified tuning signal that propagates into the cavity 122, where the magnitude of the phase shift corresponds to the magnitude of the capacitance.

The control circuit (not shown in FIG. 11) can vary the phase shift that the varactor diode 230 imparts to the portion of the amplified tuning signal that propagates into the cavity 122 by varying the magnitude of the phase-control voltage across the varactor diode.

Still referring to FIG. 11, alternate embodiments of the stub circuit 222 are contemplated. For example, the stub circuit 222 can include a variable capacitance other than the varactor diode 230, or can include another variable impedance such as a variable inductance, or a combination of a variable capacitance and inductance. Furthermore, embodiments and alternate embodiments described in conjunction with FIGS. 1-10 and 12-21 may be applicable to the stub circuit 222.

Figure 12:
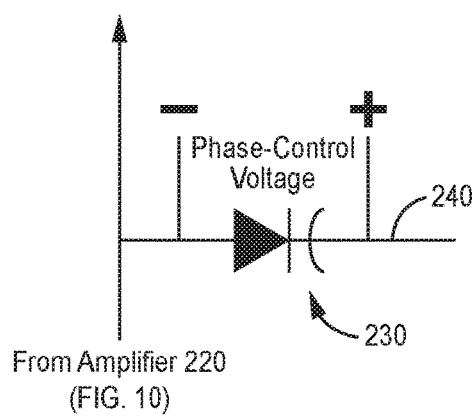
FIG. 12 is a schematic diagram of the stub of FIG. 10 in an open-circuited configuration, according to an embodiment.

FIG. 12 is a diagram of the stub circuit 222 of the tuning structure 202 of FIG. 10, according to an embodiment.

The stub circuit 222 includes the varactor diode 230 configured to couple the amplified tuning signal from the amplifier 220 to an open-circuit (high-impedance) node or conductive plane, 240, which is electrically floating.

The varactor diode 230 acts as a voltage-controlled capacitor that is coupled between the output of the amplifier 220 (FIG. 10) and the open-circuit node or conductive plane 240.

The phase-control signal, here a phase-control voltage, reverse biases the varactor diode 230 such that little or no zero-frequency (DC) current flows through the diode.

By varying the magnitude of the phase-control voltage, a control circuit (not shown in FIG. 12) can vary the capacitance of the diode 230.

And by varying the capacitance of the diode 230, the control circuit (not shown in FIG. 12) can vary the impedance that the amplified tuning signal "sees," and, therefore, can vary the phase shift that the stub circuit 222 imparts to the amplified tuning signal.

As described above in conjunction with FIG. 10, the stub circuit 222 is configured to provide this amplified and phase-shifted version of the tuning signal to the cavity at a feed location to which the output port of the stub circuit is coupled.

In operation, a control circuit (not shown in FIG. 12) generates, across the varactor diode 230, the phase-control voltage having a magnitude and having a phase that reverse biases the diode.

In response to the phase-control voltage, the reverse-biased varactor diode 230 presents, to the amplified tuning signal from the amplifier 220 (FIG. 10), a capacitance having a magnitude that corresponds to the magnitude of the phase-control voltage.

The capacitance of the varactor 230 couples a portion of the amplified tuning signal to the open-circuit node or plane 240, and imparts a phase shift to the portion of the amplified tuning signal that propagates into the cavity 122, where the magnitude of the phase shift corresponds to the magnitude of the capacitance.

The control circuit (not shown in FIG. 12) can vary the phase shift that the varactor diode 230 imparts to the portion of the amplified tuning signal that propagates into the cavity 122 by varying the magnitude of the phase-control voltage across the varactor diode.

Still referring to FIG. 12, alternate embodiments of the stub circuit 222 are contemplated. For example, the stub circuit 222 can include a variable capacitance other than the varactor diode 230, or can include another variable impedance such as a variable inductance, or a combination of a variable capacitance and inductance. Furthermore, embodiments and alternate embodiments described in conjunction with FIGS. 1-11 and 13-21 may be applicable to the stub circuit 222.

Figure 13:
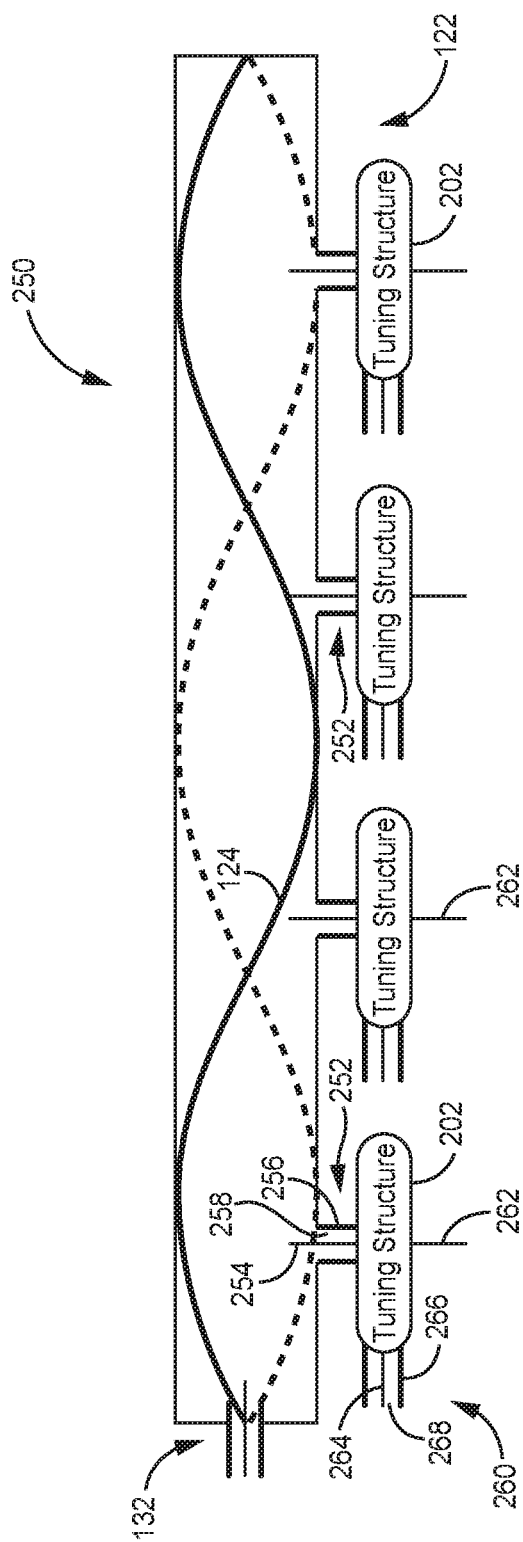
FIG. 13 is a cutaway side view of a tunable cavity of a cavity-backed MSAT, and of distributed cavity-tuning structures disposed outside of the cavity, according to an embodiment.

FIG. 13 is a cutaway side view of a cavity portion 250 of a cavity-backed MSAT array, which is configured to generate a transmission beam having a power that is significantly higher than the power of a transmission beam that the MSAT array 10 of FIG. 1 is configured to generate, according to an embodiment; in FIG. 13, components common to FIGS. 6-12 are labeled with like reference numbers. For example, any of the cavity-backed MSAT arrays 120, 160, and 180 of FIGS. 6-8, respectively, can be modified to incorporate the cavity portion 250.

A significant difference between the cavity portion 250 and the cavity portion 200 of FIG. 9 is that the tuning structures 202 are disposed outside of the cavity 122, not inside of the cavity, in the cavity portion 250. For example, the tuning structures 202 can be disposed adjacent to any one or more sides of the cavity 122, and can provide the same advantages attributed to the tuning structures as described above in conjunction with FIG. 9.

In addition to the cavity input port 132, the cavity 122 includes one or more cavity-tuning input ports 252, which are each configured to receive a respective tuned signal generated by a respective one of the tuning structures 202. For example, the ports 252 can be coaxial ports each having a respective inner conductor 254, a respective outer conductor 256, and a respective dielectric region 258.

Each tuning structure 202 is configured to receive a respective tuning input signal from a respective input port 260, and to cause the reference wave 124 to have, in the locality of a respective cavity-tuning input port 252, a local phase having a value that is set by the characteristics of the respective tuning input signal and a phase-control signal that sets a phase shift that the tuning structure imparts to the tuning input signal. For example, each tuning structure 202 can include a control node 262 configured to receive a phase-control signal from a control circuit (not shown in FIG. 13). Embodiments of the tuning structures 202 are described above in conjunction with FIGS. 10-12. Furthermore, each input port 260 can be a respective coaxial port having a respective inner conductor 264, a respective outer conductor 266, and a respective dielectric region 268. Moreover, the characteristics of each tuning input signal can include amplitude, phase, frequency, and modulation. And each phase-control signal can be a binary signal, a grayscale (i.e., a multi-bit) signal, or an analog signal, where "signal" refers to a voltage signal or to a current signal.

Still referring to FIG. 13, operation of the cavity portion 250 is described, according to an embodiment.

A signal generator (not shown in FIG. 13) generates, and provides to the input port 132, an input signal having a frequency, phase, and amplitude.

The signal generator (not shown in FIG. 13) also generates, and provides to each of the tuning ports 264, a respective tuning signal. Each tuning signal has characteristics, e.g., a frequency, phase, amplitude, or modulation, each of which can be approximately the same as, or different from, the corresponding characteristic of the input signal and of the other tuning signals. For example, one of the tuning signals may have a frequency that is approximately the same as the frequency of the input signal at the port 132 but that is different from the frequency of another tuning signal at another tuning port 252. Further in example, the signal generator can modulate (e.g., frequency, phase, or amplitude modulate) each tuning signal in a same manner, or in a different manner, relative to the other tuning signals.

The control circuit (not shown in FIG. 13) controls the signal generator (not shown in FIG. 13) to generate the input and tuning signals, generates phase-control signals on the phase-control lines 262, and selectively activates the antenna units (not shown in FIG. 13), in a manner that causes the elemental signals 127 (e.g., FIG. 8) radiated by active ones of the antenna elements 126 (e.g., FIG. 8) to have respective relative phases such that the elemental signals interfere with one another to form a corresponding beam pattern.

Next, the control circuit (not shown in FIG. 13) causes a MSAT array that incorporates the cavity portion 250 to steer one or more main beams generated by the active ones of the antenna elements 126 by sequencing the radiated elemental signals 127 through different relative-phase patterns in the manner described above. For example, the control circuit can effect such beam steering by sequentially altering at least one of the following: one or more of the characteristics of the input signal, one or more of the characteristics of one or more of the tuning signals, and one or more of the phase-control signals (to alter the respective phases that the tuning structures 202 impart to the tuning signals).

Still referring to FIG. 13, alternate embodiments of the cavity portion 250 are contemplated. For example, although shown as being evenly distributed around the outside of the cavity portion 250, the tuning structures 202 can be unevenly distributed outside of the cavity portion. Furthermore, although shown as receiving a respective tuning signal, each of one or more of the tuning structures 202 can be configured to effect a local phase change in the standing reference wave 124 without receiving a tuning signal; that is, one or more of the tuning structures may not be coupled to an input port 260, or the input port 260 may bypass the tuning structure and be coupled to the cavity 122. Moreover, a control circuit (not shown in FIG. 13) can control a signal generator (not shown in FIG. 13) to vary one or more characteristics of the input signal to the input port 132. In addition, the control circuit can also alter the amplitudes of the radiated elemental signals 127 (e.g., FIG. 8) by altering the gains of the amplifiers 128 (e.g., FIG. 8) of a MSAT that includes the cavity portion 250, by selectively turning "on" or "off" the antenna elements 126 (e.g., FIG. 8), or by altering the gains of amplifiers 220 of the tuning structures 202. Furthermore, the input port 132 can be omitted such that the cavity 122 is excited only by one or more signals input to one or more input ports 250. Moreover, one or more of the tuning structures 202 can be omitted, and one or more of the tuning input signals can be coupled directly to the cavity 122 via a port 252 or 260. In addition, although tuning structures 202 are described as being located outside of the cavity 122, one or more of the tuning structures 202 can be located inside the cavity such as described above in conjunction with FIG. 9. Furthermore, embodiments and alternate embodiments described in conjunction with FIGS. 1-12 and 14-21 may be applicable to the cavity portion 250.

Figure 14:
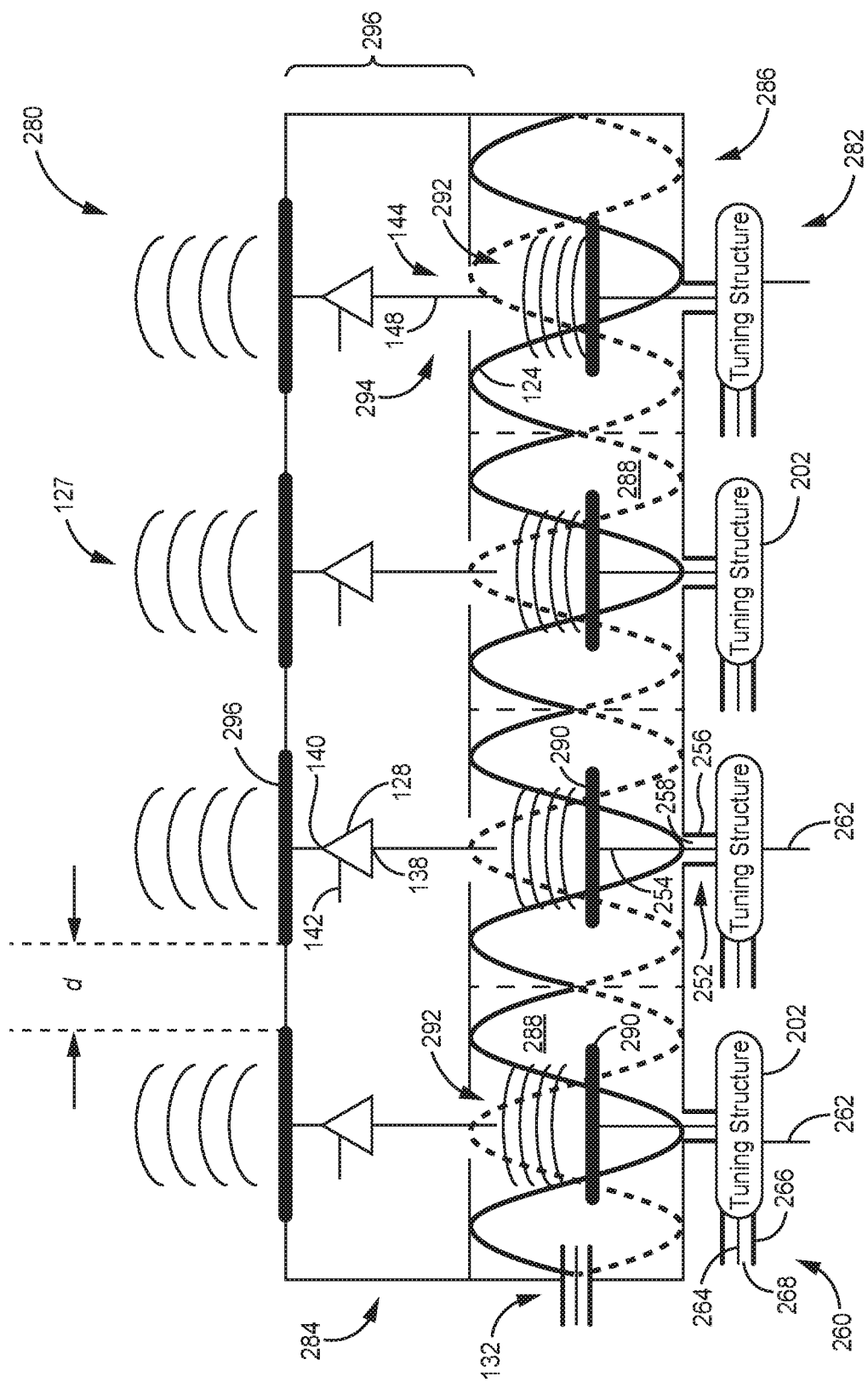
FIG. 14 is a cutaway side view of a cavity-backed MSAT, of distributed radiators disposed inside of the cavity, and of distributed controllable signal amplifiers, according to an embodiment.

FIG. 14 is a cutaway side view of a cavity-backed MSAT array 280, which is configured to generate a transmission beam having a power that is significantly higher than the power of a transmission beam that the MSAT array 10 of FIG. 1 is configured to generate, according to an embodiment; in FIG. 14, components common to FIGS. 6-13 are labeled with like reference numbers.

The array 280 includes one or more tuning structures 202, a cavity portion 282, a cavity-antenna intermediate portion 284, and antenna elements 126.

The one or more tuning structures 202 are disposed outside of the cavity portion 282, can be located adjacent to any one or more sides of a cavity 286 of the cavity portion, and can provide the same advantages attributed to the tuning structures as described above in conjunction with FIG. 9. For example, by varying the local phases of the reference wave 124 with the one or more tuning structures 202, a control circuit (not shown in FIG. 14) can vary, selectively, the relative phases of the elemental signals 127 radiated by the antenna elements 126 and, therefore, can steer a transmission beam with a finer resolution than with amplifier gain control alone. Furthermore, the ability to vary the relative phases between elemental signals 127 can allow a designer of the MSAT array 280 to increase the lattice constant (l+d) toward its theoretical limit of $\lambda_o/2$, where $\lambda_o$ is approximately the wavelength of the reference wave 124. And each of the tuning structures 202 can have one of the topologies described above in conjunction with FIGS. 10-12.

In addition to the cavity input port 132, the cavity 286 includes one or more cavity-tuning input ports 252, which are each configured to receive a respective tuned signal generated by a respective one of the tuning structures 202. For example, the ports 252 can be coaxial ports each having a respective inner conductor 254, a respective outer conductor 256, and a respective dielectric region 258.

Each tuning structure 202 is configured to receive a respective tuning input signal from a respective input port 260, and to cause the reference wave 124 to have, in the locality of a respective cavity-tuning input port 252, a local phase having a value that is set by the characteristics of the respective tuning input signal and a phase-control signal. For example, each tuning structure 202 can include a control node 262 configured to receive a phase-control signal from a control circuit (not shown in FIG. 14). Furthermore, each tuning port 260 can be a respective coaxial port having a respective inner conductor 264, a respective outer conductor 266, and a respective dielectric region 268. Moreover, the characteristics of each tuning input signal can include amplitude, phase, frequency, and modulation. And each phase-control signal can be a binary signal, a grayscale (i.e., a multi-bit) signal, or an analog signal, where "signal" refers to a voltage signal or to a current signal.

Unlike the cavity 122 of FIGS. 6-9 and 13, the cavity 286 includes subcavities 288, one subcavity per cavity input port 252. As described below, the subcavities 288 can facilitate varying the local phase of the reference wave 124. The subcavities 288 are electrically coupled to one another in a conventional manner so that the reference wave 124 spans the cavity 286.

Disposed in each subcavity 288 is a respective radiating element 290, which is configured to receive the tuning signal from a respective one of the tuning structures 202 and to radiate an excitation signal 292 in response to the tuning signal. Each excitation signal 292 excites the respective subcavity 288, and the excited subcavities together generate the standing reference wave 124. Each radiating element 290 is coupled to an inner conductor 254 of a respective tuning port 252, and a designer can select the coupling location of the radiating element so that the impedance of the coupling location approximately matches the output impedance of the tuning port. Furthermore, each radiating element 290 can have one or more characteristics that are respectively similar to one or more characteristics an antenna element 126, such characteristics including dimensions, structure, and operation.

The antenna-cavity intermediate portion 284 is disposed over the cavity portion 282, and includes signal couplers 294 and amplifiers 128, one signal coupler and one amplifier per subcavity 288.

Each signal coupler 294 includes a respective iris 144 and a respective conductive probe 148, which extends through the iris and into a respective subcavity 288.

Each amplifier 128 includes an input node 138 coupled to a respective probe 148, an output node 140 coupled to a respective antenna element 126, and a control node 142 configured to receive a gain-control signal from a control circuit (not shown in FIG. 14). The output node 140 can contact the respective antenna element 126 at a location having an impedance that approximately matches the output impedance of the amplifier 128.

And the combination of a signal coupler 294, amplifier 128, and antenna element 126 forms an antenna unit 296.

Still referring to FIG. 14, operation of the MSAT antenna array 280 is described, according to an embodiment.

A signal generator (not shown in FIG. 14) generates, and provides to the input port 132, an input signal having a frequency, phase, amplitude, and possibly a modulation.

The signal generator (not shown in FIG. 14) also generates, and provides to each of the tuning ports 260, a respective tuning signal. Each tuning signal has characteristics, e.g., a frequency, phase, amplitude, or modulation, each of which can be approximately the same as, or different from, the corresponding characteristic of the input signal and of the other tuning signals. For example, one of the tuning signals may have a frequency that is approximately the same as the frequency of the input signal at the port 132 but that is different from the frequency of another tuning signal at another tuning port 260. Further in example, the signal generator can modulate (e.g., frequency, phase, or amplitude modulate) each tuning signal in a same manner, or in a different manner, relative to the other tuning signals.

The control circuit (not shown in FIG. 14) controls the signal generator (not shown in FIG. 14) to generate the input and tuning signals, generates gain-control signals on gain-control lines 142, generates phase-control signals on phase-control lines 262, and selectively activates the antenna units 296 (e.g., with non-zero gain-control signals), in a manner that causes the elemental signals 127 radiated by active ones of the antenna elements 126 to have respective phases such that the elemental signals interfere with one another to form a corresponding beam pattern.

In response to the phase-control signals, each of tuning structures 202 shifts the phase of a respective one of the tuning signals by an amount corresponding to a value of the respective phase-control signal.

Each radiating element 290 generates, in response to the phase-shifted tuning signal from a respective tuning structure 202, an excitation signal 292, which causes the reference wave 124 to have, at a respective probe 148, a local phase that corresponds (e.g., approximately equals) the phase of the phase-shifted tuning signal.

Next, the iris 144, probe 148, or the combination of the iris and probe, converts the standing reference wave 124 at the probe into an intermediate signal, and provides the intermediate signal to the input node 138 of the respective amplifier 128. The intermediate signal has a phase that depends on the local phase of the reference wave 124 at the probe 148, the local phase at the probe depends on the phase of the signal 292 radiated by the radiator 290, and the phase of the radiated signal depends on the phase of the signal generated by the respective tuning structure 202.

Then, the respective amplifier 128 amplifies the intermediate signal at its input node 138, and drives the respective antenna element 126 with the amplified intermediate signal.

Consequently, the elemental signal 127 has a phase and an amplitude (power) that are set by the control circuit (not shown in FIG. 14).

Next, the control circuit (not shown in FIG. 14) causes the MSAT 280 to steer one or more main beams generated by the active ones of the antenna elements 126 by sequencing the radiated elemental signals 127 through different phase and amplitude patterns in the manner described above. For example, the control circuit can effect such beam steering by sequentially altering at least one of the following: one or more of the characteristics of the input signal, one or more of the characteristics of one or more of the tuning signals, one or more of the phase-control signals, and one or more of the gain-control signals.

Still referring to FIG. 14, alternate embodiments of the MSAT array 280 are contemplated. For example, a radiator 290 can be omitted from one or more of the subcavities 288, or one or more subcavities can include more than one radiator. Furthermore, the ratio of subcavities 288 to antenna units 296 can be less than, or more than, 1:1; for example, multiple antenna units may "share" a single subcavity, or an antenna unit may span multiple subcavities. Moreover, one or more of the amplifiers 128 can be disposed outside of the cavity-antenna intermediate portion 284. In addition, one or more of the subcavities 288 may receive no tuning signal, or may receive a tuning signal directly from the signal generator (not shown in FIG. 14) instead of from a respective tuning structure 202. Furthermore, one or more of the subcavities 288 can be eliminated. Moreover, embodiments and alternate embodiments described in conjunction with FIGS. 1-13 and 15-21 may be applicable to the MSAT array 280.

Figure 15:
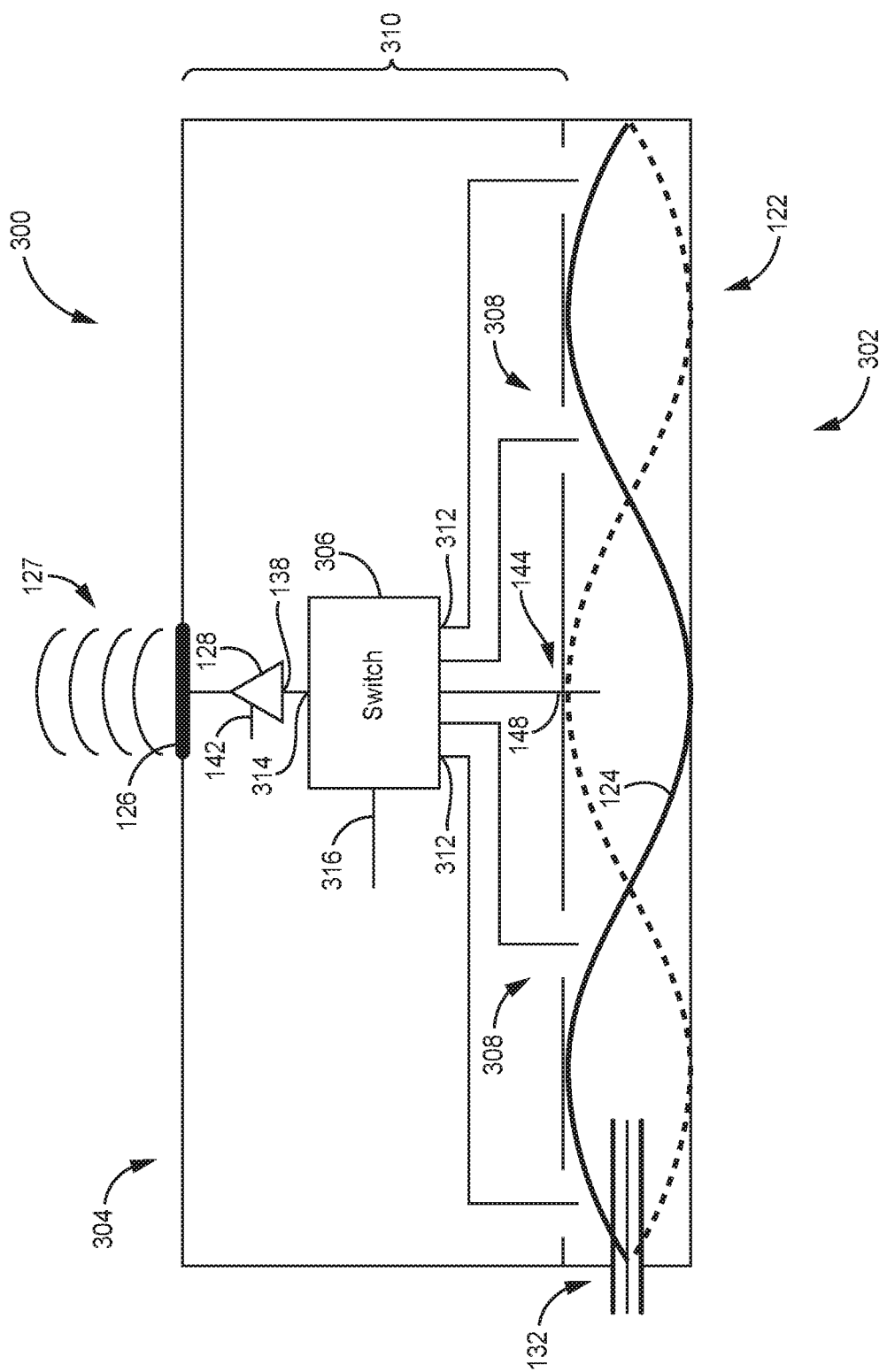
FIG. 15 is a cutaway side view of a cavity-backed MSAT, and of distributed shared controllable signal amplifiers, according to an embodiment.

FIG. 15 is a cutaway side view of a portion of a cavity-backed MSAT array 300, which is configured to generate a transmission beam having a power that is significantly higher than the power of a transmission beam that the MSAT array 10 of FIG. 1 is configured to generate, according to an embodiment; in FIG. 15, components common to FIGS. 6-14 are labeled with like reference numbers.

The array 300 is configured to shift the phase of an elemental signal 127 by selectively feeding the antenna element 126 that generates the elemental signal from one of multiple locations of the cavity 122. As stated above, by shifting, selectively, the relative phases between elemental signals 127, a control circuit (not shown in FIG. 15) can steer a transmission beam with a finer resolution than with amplifier gain control alone. Furthermore, the ability to shift the relative phases between elemental signals 127 can allow a designer of the MSAT array 300 to increase the lattice constant (l+d) toward its theoretical limit of $\lambda_o/2$, where $\lambda_o$ is the free-space wavelength of the reference wave 124.

The MSAT array 300 includes a cavity portion 302, a cavity-antenna intermediate portion 304, and the antenna elements 126.

In addition to the cavity 122, the cavity portion 302 includes the cavity input port 132, and otherwise can be similar to the cavity portion of FIG. 6.

The cavity-antenna intermediate portion 304 includes one or more amplifiers 128, one or more electronic switches 306, and signal couplers 308. Each group of one antenna 126, a corresponding amplifier 128, a corresponding switch 306, and corresponding signal couplers 308 coupled to the switch, form a respective antenna unit 310.

Each switch 306 has multiple input nodes (here four input nodes) 312 each coupled to a respective signal coupler 308, has an output node 314 coupled to the input node 138 of a respective amplifier 128, and has an input-selection port 316 having one or more lines. The switch 306 can have any suitable structure. For example, the switch 306 can be an analog demultiplexer formed from one or more transistors.

And each signal coupler 308 includes a respective iris 144 and a respective probe 148, which is coupled to a respective input node of the switch 306 in the same antenna unit 310.

Still referring to FIG. 15, operation of the MSAT antenna array 300 is described, according to an embodiment.

A signal generator (not shown in FIG. 15) generates, and provides to the input port 132, an input signal having a frequency, phase, amplitude, and possibly a modulation.

In response to the input signal at the input port 132, the cavity 122 generates the standing reference wave 124.

In response to the reference wave 124, the iris 144, the probe 148, or the combination of the iris and probe, of a respective signal coupler 308, generates an intermediate signal having a phase that corresponds to the local phase of the reference wave at the location of the signal coupler. For example, the intermediate signal can have the same phase as the local phase of the reference wave 124, or the iris 144, the probe 148, or the combination of the iris and the probe can add a phase shift to the local phase of the reference wave such that the phase of the intermediate signal is different than the local phase of the reference wave. Regardless of whether the signal coupler 308 adds a phase shift to the reference wave, the intermediate signals generated by the signal couplers 308 of an antenna unit 310 have different phases.

The control circuit (not shown in FIG. 15) controls the signal generator (not shown in FIG. 15) to generate the input signal at the input 132, generates gain-control signals on the amplifier gain-control lines 142, generates input-selection signals on the input-selection ports 316, and selectively activates the antenna units 310 (e.g., with non-zero gain-control signals), in a manner that causes the elemental signals 127 radiated by active ones of the antenna elements 126 to have respective amplitudes and phases such that the elemental signals interfere with one another to form a corresponding beam pattern. In response to an input-selection signal on a port 316, a respective switch 306 couples, to the output node 314, the one of the input nodes 312 corresponding to the value of the input-selection signal. For example, where, as in this example, the switch 306 includes four input nodes 312, the input-selection signal can be a two-bit binary signal whose value (00, 01, 10, or 11) corresponds to a respective one of the input nodes. Further in example, an input-selection signal of 00 causes the switch 306 to couple, to the output node 314, the input node 312 corresponding to 00, an input-selection signal of 01 causes the switch 306 to couple, to the output node 314, the input node 312 corresponding to 01, and so on. Therefore, by controlling which input node 312 the switch 306 couples to the switch output node 314, the control circuit controls which intermediate signal, and, therefore, which phase, to couple to antenna element 126 via the amplifier 128.

Then, the respective amplifier 128 amplifies the selected intermediate signal at its input node 138, and drives the respective antenna element 126 with the amplified intermediate signal.

Consequently, the elemental signal 127 has a phase and an amplitude (power) that are set by the control circuit (not shown in FIG. 15).

Next, the control circuit (not shown in FIG. 15) causes the MSAT 300 to steer one or more main beams generated by the active ones of the antenna elements 126 by sequencing the radiated elemental signals 127 through different phase and amplitude patterns in the manner described above. For example, the control circuit can effect such beam steering by sequentially altering at least one of the following: one or more of the characteristics of the input signal, one or more of the phase-selection signals, and one or more of the gain-control signals.

Still referring to FIG. 15, alternate embodiments of the MSAT array 300 are contemplated. For example, any of the MSAT antenna arrays 40, 60, 80, 100, 120, 160, 180, and 280 of FIGS. 2-8 and 14, respectively, can be modified to include a cavity-antenna intermediate region, such as the cavity-antenna intermediate region 304, which includes one or more switches 306 or similar switch connection topologies. Furthermore, one or more of the switches 306 can include more than one output node 314, each output node coupled to a respective amplifier, so that the control circuit (not shown in FIG. 15) can be configured to cause the switch to couple each of multiple ones of the input nodes 312 to a respective one of the output nodes 314. Furthermore, embodiments and alternate embodiments described in conjunction with FIGS. 1-14 and 16-21 may be applicable to the MSAT array 280.

Figure 16:
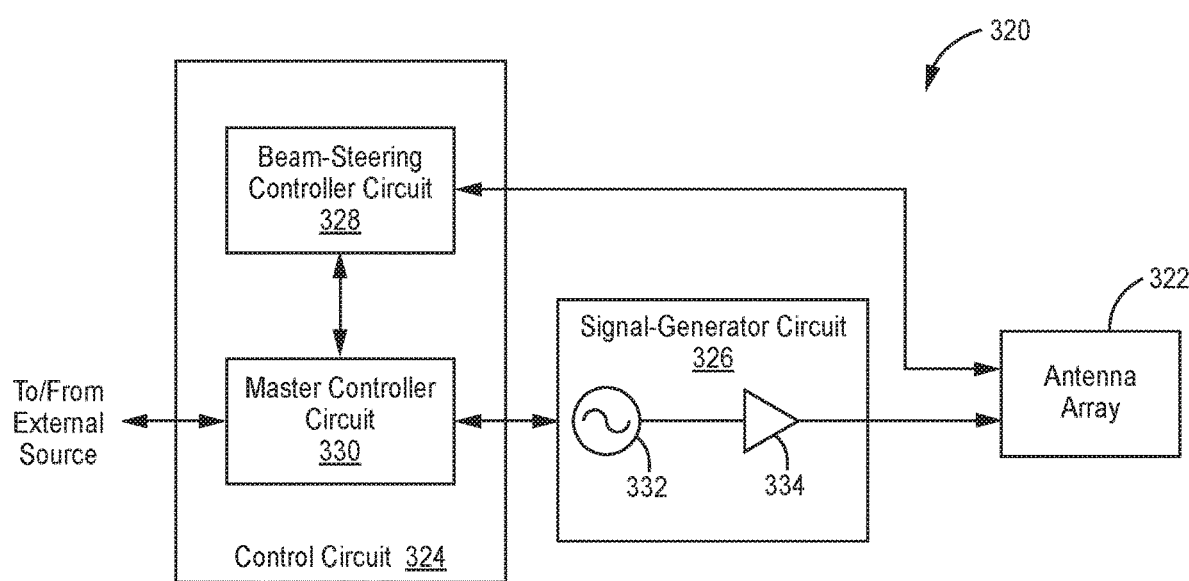
FIG. 16 is a diagram of an antenna subsystem that includes one or more of the antenna arrays of FIGS. 2-8 and 14-15, according to an embodiment.

FIG. 16 is a diagram of an antenna-array subsystem 320, which incorporates one or more MSAT antenna arrays 322 (only one MSAT antenna array shown in FIG. 16), according to an embodiment. For example, each of the one or more MSAT antenna arrays 322 can be, or can include, any of the MSAT antenna arrays 40, 60, 80, 100, 120, 160, 180, 280, and 300 of FIGS. 2-8 and 14-15, respectively.

In addition to the one or more MSAT antenna arrays 322, the subsystem 320 includes a control circuit 324 and a signal-generator circuit 326.

The control circuit 324 includes a beam-steering controller circuit 328 and a master controller circuit 330. The beam-steering controller circuit 328 is configured to generate gain-control signals, phase-control signals, and any other suitable signals, that cause the antenna array 322 to steer one or more main transmission beams in one or two dimensions by generating a time sequence of beam patterns. And the master controller circuit 330 is configured to control the beam-steering controller circuit 328 to operate as described above and below, and to control the signal-generator circuit 326, as described below, to generate the one or more input signals that the antenna array 322 converts into either a traveling reference wave or a standing reference wave. For example, the control circuit 324 can be, or include, one or more microprocessors or microcontrollers that are software programmed to perform beam-steering and master-control functions. Or, the control circuit 324 can be, or can include, a hardwired integrated circuit, or a bit-stream-programmable circuit (e.g., and field-programmable gate array (FPGA)). Alternatively, the control circuit 324 can be, or can include, a combination of two or more of hardwired circuitry, and software-programmable circuitry, and bit-stream-programmable circuitry.

The signal-generator circuit 326 includes a signal-controlled oscillator 332 and a low-noise amplifier 334. The oscillator 332 is configured to generate one or more input signals having one or more characteristics in response to one or more signal-generation control signals from the master control circuit 330. Examples of such characteristics include phase, amplitude, and modulation (e.g., phase modulation, amplitude modulation, frequency modulation). And the amplifier 334 is configured to amplify, or otherwise to buffer, the one or more signals from the oscillator 332 in response to one or more gain-control signals from the master controller 330, and to provide the amplified, or otherwise buffered, one or more signals to the antenna array 322 as the one or more input signals that the antenna array is configured to convert into a traveling or standing reference wave.

Still referring to FIG. 16, operation of the antenna-array subsystem 320 is described, according to an embodiment.

The master control circuit 330 receives, from an external source (not shown in FIG. 16) data describing the desired beam patterns for the antenna array 322 to generate and to steer. Examples of the external source include a memory of another electronic device, or a human operator entering program instructions via an input-output device such as a keyboard or displayed menu.

The master control circuit 330 next generates one or more signal-generation control signals to the signal-generator circuit 326, one or more gain-control signals to the amplifier circuit 334, and one or more beam-steering control signals to the beam-steering controller circuit 328.

In response to the one or more signal-generation control signals, the oscillator 332 generates one or more antenna-input signals each having a phase, amplitude, and possibly a modulation, corresponding to the signal-generation control signals. For example, the oscillator 332 may generate some or all of the signals with no modulation, may generate some or all of the signals with zero amplitude, and may generator some or all of the signals with the same phase.

In response to the one or more gain-control signals, the amplifier circuit 334 amplifies, or otherwise buffers, each of the one or more antenna-input signals from the oscillator 332, and provides the amplified, or otherwise buffered, antenna-input signals to the antenna array 322, which converts the one or more antenna-input signals into a traveling or standing reference wave (not shown in FIG. 16).

In response to the one or more beam-steering control signals from the master controller circuit 330, the beam-steering controller circuit 328 generates one or more gain-control signals (not to be confused with the gain-control signals for the amplifier circuit 334), one or more phase-control signals, or a combination of one or more gain-control signals and one or more phase-control signals, and provides these signals to the antenna array 322.

In response to the one or more control signals from the beam-steering controller circuit 328, the antenna array 322 generates and steers one or more main transmission beams as described above in conjunction with FIGS. 2-9 and 13-15.

Still referring to FIG. 16, alternate embodiments of the antenna-array subsystem 320 are contemplated. For example, the signal-generator circuit 326 can include more than one oscillator circuit 332, and more than one amplifier circuit 334. Furthermore, the subsystem 320 may include more than one control circuit 324. Moreover, the subsystem 320 may include components omitted from FIG. 16. In addition, embodiments and alternate embodiments described in conjunction with FIGS. 1-15 and 17-21 may be applicable to the antenna-array subsystem 320.

Figure 17:
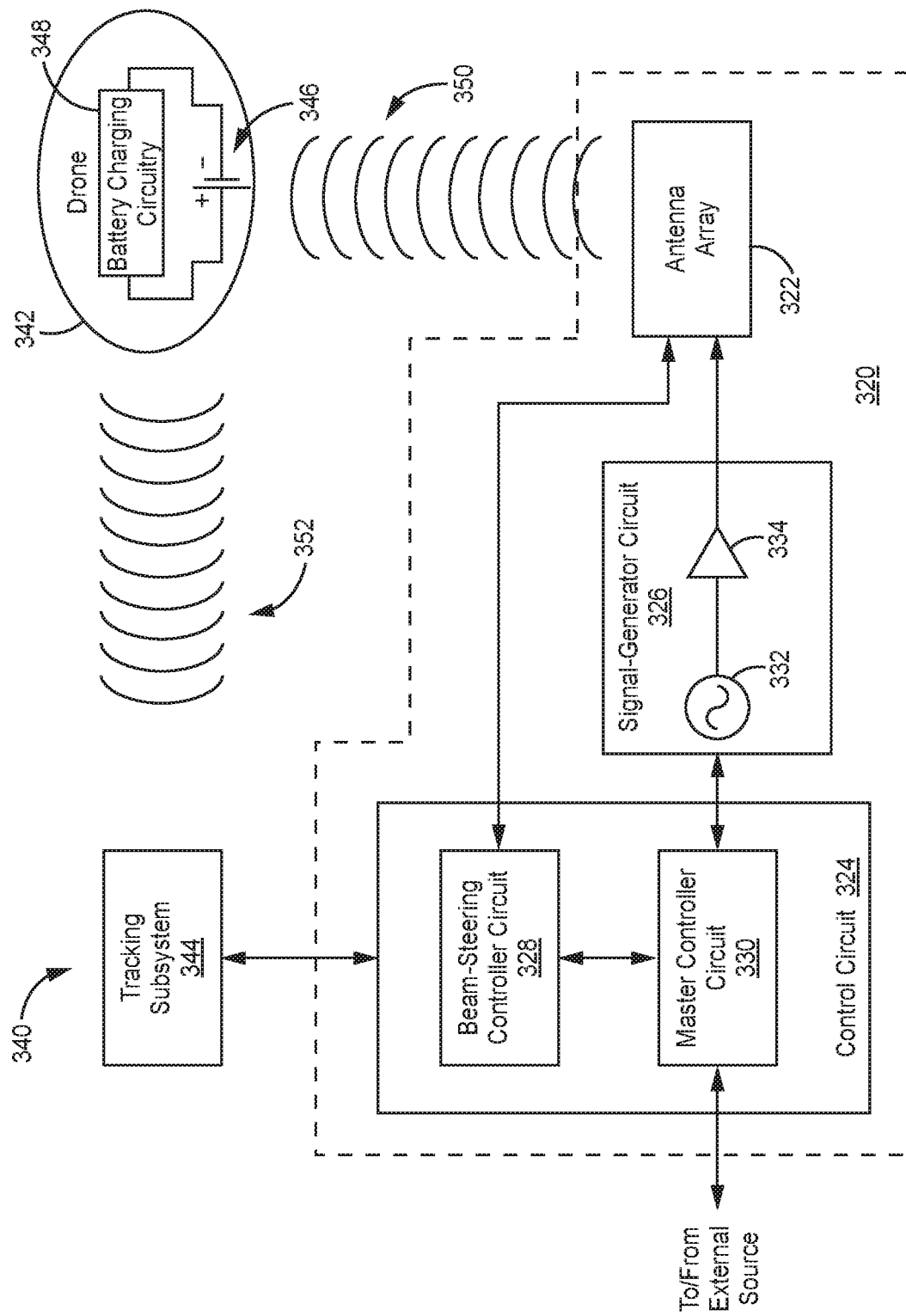
FIG. 17 is a diagram of a system that includes one or more of the antenna subsystems of FIG. 14, according to an embodiment.

FIG. 17 is a diagram of a system 340, which incorporates one or more of the MSAT antenna-array subsystem 320 of FIG. 16 (only one MSAT antenna-array subsystem 320 shown in FIG. 17), according to an embodiment.

In addition to the subsystem 320, the system 340 includes one or more drones 342 (only one drone shown in FIG. 17) and a tracking subsystem 344.

Each of the one or more drones 342 can be any suitable type of conventional drone, such as a flying drone, and can carry, or otherwise can include, any suitable equipment, such as computing circuitry (e.g., microprocessor, microcontroller), a camera, and one or more other sensors (e.g., sound sensor, chemical sensor, light sensor, motion sensor).

Furthermore, each drone 342 includes one or more batteries 346 (only one battery shown in FIG. 17), and includes a battery-charging circuit 348, which is configured to charge or recharge the one or more batteries, and to power the drone (e.g., can power the drone's motors and other components) in response to one or more energy beams 350 (only one energy beam shown in FIG. 17) of electromagnetic energy radiated by an antenna array 322 of the subsystem 320.

The tracking subsystem 344 can be any suitable tracking subsystem, can include any suitable circuitry and other components, and is configured to determine, and to track, the respective position(s) of the one or more drones 342, and to provide information regarding the drone position(s) to the control circuit 324. For example, the tracking subsystem 344 can include, or can be, a radar subsystem that generates a radar beam (not shown in FIG. 17) for determining the positions of the one or more drones 342. Or, each of the one or more drones 342 can emit a respective position signal 352 (only one signal 350 shown in FIG. 17), which the tracking subsystem 344 is configured to receive and to process to determine the position of the respective drone. Alternatively, each of the one or more drones 342 can include a GPS unit (not shown in FIG. 17) configured to determine the position of the drone, and can include a transmitter (not shown in FIG. 17) configured to transmit, to the tracking subsystem 344, the position signal 352, which, in this example, carries the GPS-determined position of the drone.

And the control circuit 324 is configured to steer the one or more energy beams 350 radiated by the antenna array 322 in response to the drone-position information from the tracking circuit 344 so that the one or more energy beams are approximately directed toward the drone(s) even as the drone(s) is(are) moving; that is, the control circuit is configured to steer the one or more energy beams "to follow" or "to track" the drone(s).

By steering the one or more energy beams 350 to follow the one or more drones 342, the control circuit 324 can eliminate the need for the one or more drones to be taken out of service for battery charging by allowing the battery-charging circuit 348 to charge the one or more batteries 346 while the one or more drones are in service, e.g., while the one or more drones are flying. Furthermore, because a drone 342 may discharge a battery faster than the battery-charging circuit 348 charges the battery, the control circuit 324 can control, or otherwise allow, the battery-charging circuit 348 to power the drone while the circuit is charging the one or more batteries 346. For example, if the power consumption of a drone 342 is 100 W, then the control circuit 324 can cause the battery-charging circuit 348 to provide 120 W of power, 100 W to power the drone, and 20 W to charge the one or more batteries 346. Moreover, the control circuit 324 can control, or otherwise allow, the battery-charging circuit 48 to power the drone while all of the one or more batteries 346 are fully charged.

Still referring to FIG. 17, operation of the system 340 is described, according to an embodiment. For purposes of example, it is assumed that the one or more drones 342 are flying drones each including a respective single battery 346; but the following description can apply if one or more of the one or more drones are other than flying drones or includes multiple batteries.

First, the antenna subsystem 320 and the tracking subsystem 344 are activated, and the one or more drones 342 are activated and put into service.

The antenna subsystem 320 generates the one or more energy beams 350 (e.g., a respective energy beam for each drone 342) in a manner similar to that described above in conjunction with FIG. 16.

The tracking subsystem 344 determines and tracks the respective position of each of the one or more drones 342. For example, the tracking subsystem 344 receives, from each of the one or more drones 342, a respective position beam 352 from which the tracking subsystem determines the position of the corresponding drone.

The tracking subsystem 344 then provides, to the control circuit 324, the position of each drone 342 on an ongoing basis. For example, the tracking subsystem 344 may send, to the control circuit 324, an updated position of each drone 342 approximately every ten milliseconds (ms).

In response to the drone positions received from the tracking subsystem 344, the master control circuit 330 determines, in a conventional manner for each energy beam, the respective angle that will cause the main longitudinal axis of the energy beam to approximately intersect the position of a respective drone 342. For example, the master control circuit 330 can determine the respective angle in response to the position of the respective drone 342 and the position of the antenna array 322, which, if the position of the antenna array is fixed, may be stored in a memory (not shown in FIG. 17) onboard the control circuit 324. But if the antenna array 322 moves over time, then the antenna array can include a position sensor (e.g., a GPS unit), and can send the position of the antenna array to the control circuit 324 on an ongoing basis. For example, the antenna array 322 may send, to the control circuit 324, an updated position of the antenna array approximately every ten milliseconds (ms).

In response to the respective one or more beam angles, the master control circuit 330 provides, to the beam-steering control circuit 328, drone-position information sufficient for the beam-steering control circuit to steer each of the one or energy beams 350 to its respective determined angle, and instructs the beam-steering control circuit to steer the one or more energy beams accordingly. For example, the master control circuit 330 may update the drone-position information approximately every ten ms, and the beam-steering control circuit 328 may update the angle of each energy beam 350, i.e., may steer each energy beam to a different position, approximately every ten ms such that the energy beam follows/tracks a respective drone 342.

The respective battery-charging circuit 348, or another circuit, onboard each drone 342 monitors the charge level of the respective battery 346.

In response to the charge level of a battery 346 falling to or below a respective discharge threshold voltage (e.g., 23.5 Volts DC (VDC)), the respective battery-charging circuit 348 charges the battery, and powers the drone (e.g., the drone motors and lights), using energy from a respective energy beam 350. For example, the battery-charging circuit 348 converts at least a portion of the energy beam 350 into a power-and-charging signal (e.g., a power-and-charging voltage signal or a power-and-charging current signal), and charges the battery 346 and powers the drone 342 with the power-and-charging signal until the charge level of the battery equals or exceeds a charge threshold voltage (e.g., 24.1 VDC). Alternatively, the battery-charging circuit 348 can convert at least a portion of the energy beam 350 into a power signal, and can power the drove 342 with the power signal, even after the battery 346 is fully charged.

Because the each energy beam 350 tracks a respective drone 342, the battery-charging circuit 348 onboard a respective drone can charge the battery 346 while the drone is in service, thus reducing or eliminating the need for the drone to be taken out of service for charging the battery.

Still referring to FIG. 17, alternate embodiment of the system 340 are contemplated. For example, the tracking subsystem 344 can be omitted, the antenna subsystem 322 can be configured to emit one or more stationary energy beams 350, and each drone 342 can be configured to return to the location of a corresponding energy beam in response to the drone's battery 346 needing charging (the location can be programmed into, or otherwise provided to, each drone); because the location can allow the drone 342 to remain airborne while charging its battery, the drone need not be taken out of service. Furthermore, instead of having one beam per drone 342, the antenna array 322 can radiate fewer than one beam per drone, or even just one beam, and the drones can "share" the beams. For example, a drone 342 can notify the tracking subsystem 344 when the drone's battery 346 needs a charge, and the tracking subsystem can track, and provide to the control circuit 324, the position of the charge-requesting drone. In response to the position from the tracking subsystem 344, the beam-steering control circuit 328 can steer one of the energy beams radiated by the antenna array 322 to track the charge-requesting drone 342 so that the drone can charge its battery 346. Alternatively, the control circuit 324 can change the tracking of an energy beam periodically from one drone 342 to another drone, each drone can sense an energy beam being directed toward the drone, and each drone can selectively activate its battery-charging circuit 348 while the antenna array 322 is directing an energy beam at the drone. Moreover, to better direct an energy beam toward a drone 342, the system 340 can dither the angle/direction of the energy beam to find the beam angle/direction at which the drone is able to obtain maximum power from the beam. For example, the battery-charging circuit 348, or other circuitry, onboard the drone 342 can determine the level of power transfer from an energy beam, and can provide this level to the tracking subsystem 344. The tracking subsystem 344, or the antenna subsystem 320, while tracking the energy beam to the drone's position, can dither the beam back and forth slightly to find the beam position (relative to the drone 342) that provides the highest level of power transfer to the drone. After the tracking subsystem 344 or the antenna subsystem 320 determines the highest-power-transfer beam angle/direction for a particular drone, it can store a beam-angle offset for that drone. Thereafter, the beam-steering control circuit 328 can add this offset to the beam position that the master control circuit 330 determines in response to the drone-position information from the tracking subsystem 344 to improve power transfer from the energy beam to the respective drone 342. In addition, the antenna subsystem 320 and the tracking subsystem 344 can be used in systems other than a drone system, and for applications other than battery charging. Furthermore, the control circuit 324 can cause the battery-charging circuit 348 to power a drone 342 even when the drone includes no battery, includes one or more fully charged batteries, or includes only depleted batteries. Such a "no-battery" mode can be useful, for example, to allow an increased payload size and weight for an application in which the drone carries an item (e.g., delivers a package) from one location to another location. Moreover, embodiments and alternate embodiments described in conjunction with FIGS. 1-16 and 18-21 may be applicable to the system 340.

Figure 18:
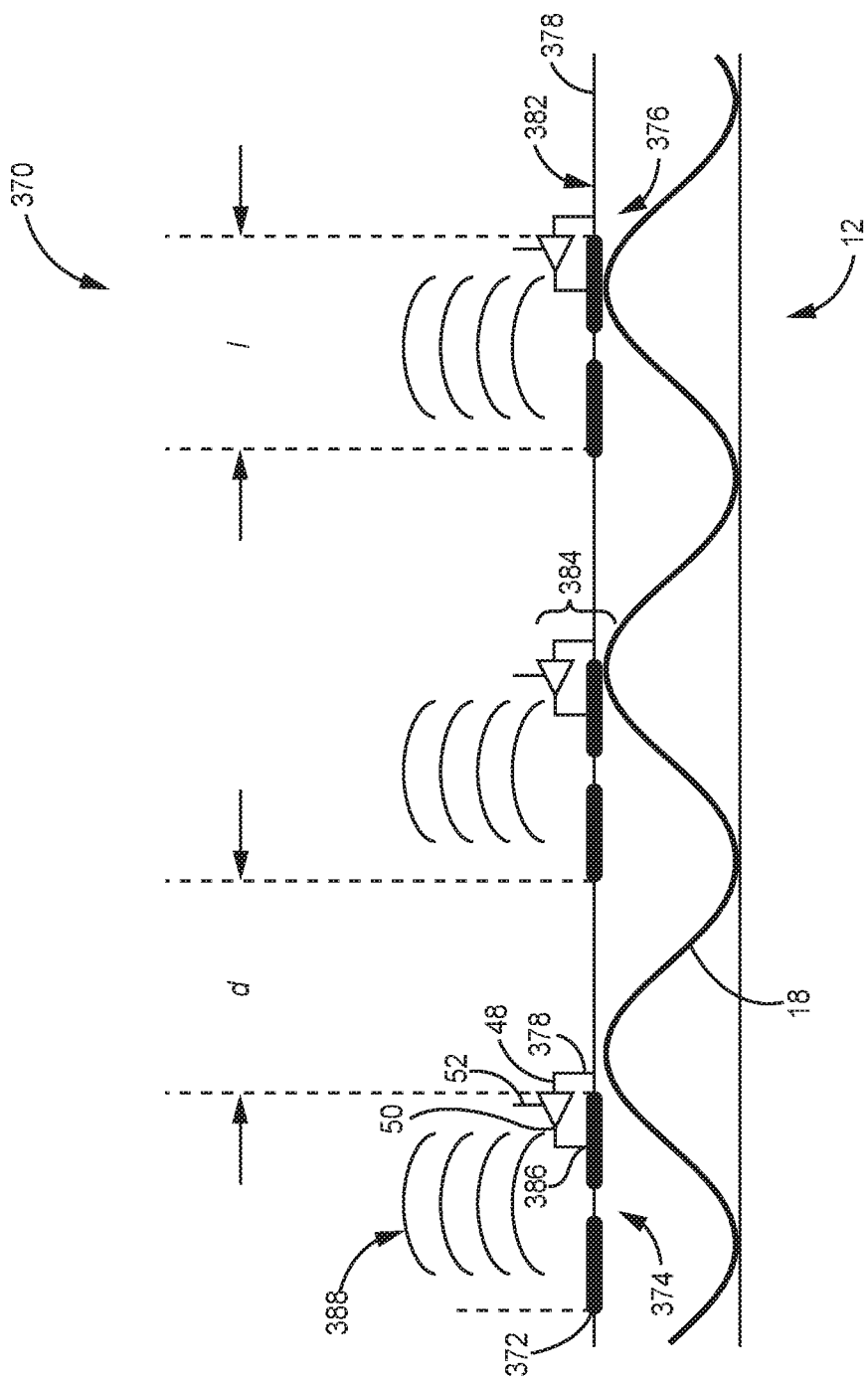
FIG. 18 is a cutaway side view of a waveguide-backed MSAT including distributed controllable signal amplifiers, according to another embodiment.

FIG. 18 is a cutaway side view of a waveguide-backed MSAT array 370, which is configured to generate a transmission beam having a power that is significantly higher than the power of a transmission beam that the MSAT array 10 of FIG. 1 is configured to generate, according to an embodiment.

Figure 19:
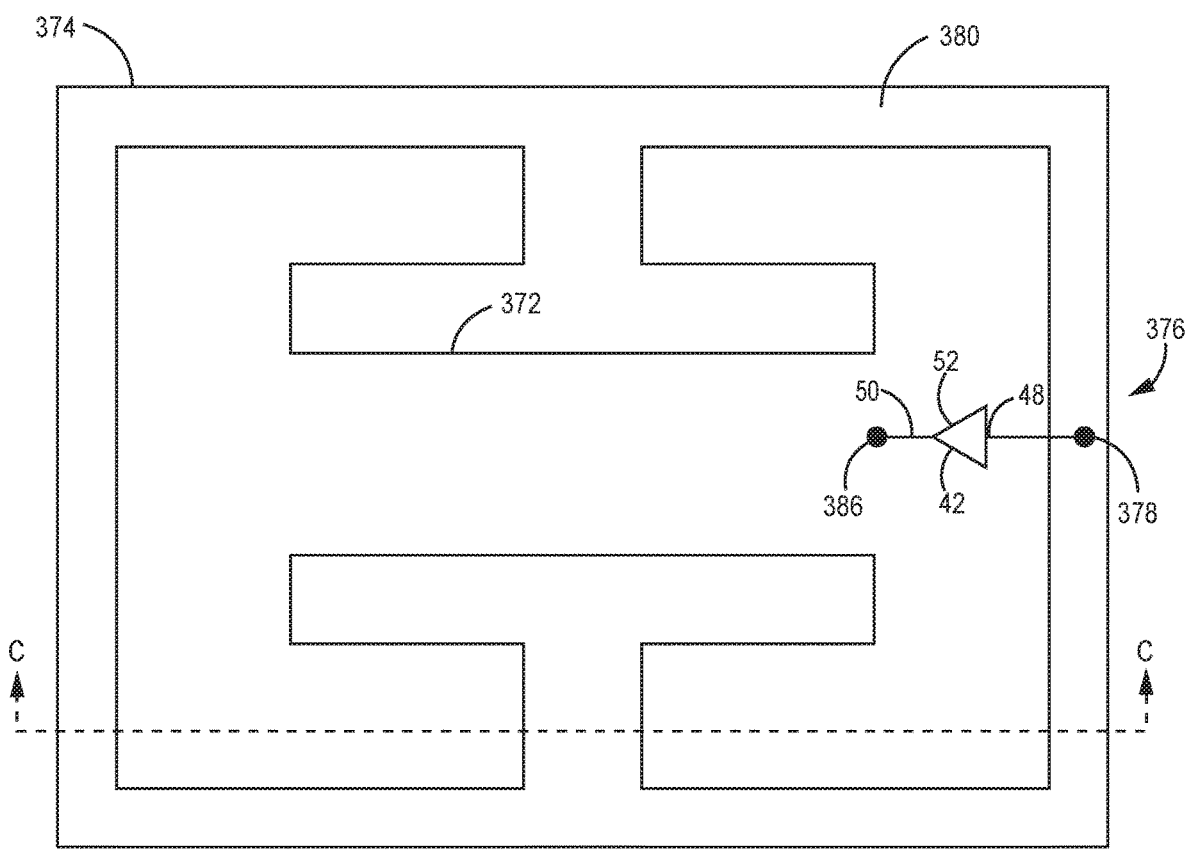
FIG. 19 is a plan view of one of the antenna elements of the antenna array of FIG. 18, according to an embodiment.

FIG. 19 is a plan view of one of the antenna elements 372 of the antenna array 370 of FIG. 18, according to an embodiment in which the view of FIG. 18 is taken along lines C-C of FIG. 19. In FIGS. 18-19, like numbers are used to reference components common to FIGS. 2 and 18-19. Furthermore, although only one antenna element 372 is shown in FIG. 19, it is understood that the other antenna elements of the antenna array 370 are structurally configured, and operate, in a similar manner.

Referring to FIGS. 18-19, the MSAT array 370 is similar to the MSAT array 40 of FIG. 2 except each antenna element 372 of the array 370 is disposed within, not over, a respective iris 374.

Each signal coupler 376 includes a respective iris 374 and a respective probe 378.

Each probe 378 extends to, but not through, a respective iris 374, and is configured to generate an intermediate signal in response to an iris signal generated by the respective iris. Alternatively, each conductive probe 378 may extend partially or fully into the respective iris 374, or may extend through the respective iris into the transmission medium 12. In the latter case, the probe is configured to generate the intermediate signal in response to the reference wave 18 at the location of the probe.

Each antenna element 372 has a shape and orientation that impart to the antenna element a radiating characteristic and an impedance that is suitable for the intended application of the array 370. For example, a combination of the antenna element 372, and one or more impedances that the antenna element "sees," may be configured to resonate at the frequency of the reference wave 18.

Furthermore, each antenna element 372 is disposed in a respective iris 374 such that the antenna element effectively forms a conductive "island" inside of the respective iris. For example, the antenna element 372 can be patterned (e.g., etched) from a conductive upper portion 378 of the transmission medium 12. Because a region 380 of the iris 374 surrounding the antenna element 372 lacks a conductor, and because the antenna element 372 is formed from a conductor, the antenna element may be referred to as a "complementary antenna element" or a "complementary MSAT element."

Each of the amplifiers 42 is disposed over the transmission medium 12 (e.g., mounted on a surface 382 of the MSAT array 370), and includes an input node 48 coupled to a respective conductive probe 376, an output node 50 coupled to a respective antenna element 372, and a control node 52 configured for coupling to a control circuit (not shown in FIGS. 18-19); furthermore, the combination of an antenna element 372, a corresponding amplifier 42, and a corresponding signal coupler 376 forms a respective antenna unit 384. Moreover, although not shown, each amplifier 42 includes a power terminal configured to receive operating power. And the amplifier output node 50 of each amplifier 42 can be coupled to any suitable location 386 of the respective antenna element 372, for example, so that the impedance of the respective antenna element at the coupling location approximately matches the output impedance of the amplifier.

By generating a binary control signal on the control node 52, the control circuit (not shown in FIGS. 18-19) can turn a respective amplifier 42 "on" and "off." While "on," the amplifier 42 receives from the probe 378, and amplifies, the intermediate signal with a gain, and provides, via the output node 50, the amplified intermediate signal to the antenna element 372, which effectively converts the amplified intermediate signal into an elemental signal 388, and which radiates the elemental signal. Alternatively, by generating an analog control signal, or a digital signal having more than two values, the control circuit not only can turn the amplifier 42 "on" and "off," but the control circuit also can control the gain of the amplifier between "on" and "off."

Furthermore, each of the amplifiers 42 can have any suitable circuit topology and operational parameters, and can be located at any suitable location of the MSAT array 370. For example, each of one or more of the amplifiers 42 can include a single transistor having its control node (e.g., a base if the transistor is a bipolar junction transistor (BJT), a gate if the transistor is a field-effect transistor (FET)) coupled to the control node 52 of the amplifier, and having its conduction nodes (collector and emitter if the transistor is BJT, drain and source if the transistor is an FET) coupled to the input node 48 and output node 50 of the amplifier. Or, each of one of more of the amplifiers 42 can include, or be, a surface-mount operational amplifier having a voltage- or current-controlled gain.

Still referring to FIGS. 18-19, operation of the MSAT array 370 is described, according to an embodiment. Although operation of one antenna unit 384 is described, it is understood that others of the antenna units can be configured to operate in a similar fashion. Furthermore, the reference wave 18 can have any suitable power level (e.g., ≤250 Watts (W), such a few tens of mW to a few tens of W) at the input port (not shown in FIGS. 18-19) to the transmission medium 12. For example, an amplifier 42 having a gain of 30 dB can generate an elemental signal 388 having a power of 1 W in response to a signal having a power of 1 mW at its input node 48. Consequently, such an embodiment of the array 370 having one thousand antenna elements 372 can generate a transmission beam of about 1 KW from a reference wave 18 of 100 mW-10 W at the reference-wave input port (not shown in FIGS. 18-19).

The probe 378 generates an intermediate signal in response to the reference wave 18.

The amplifier 42 generates an amplified intermediate signal on the amplifier output node 50 by amplifying the intermediate signal on the amplifier input node 48 in response to the gain-control signal that the control circuit (not shown in FIGS. 18-19) generates on the gain-control node 52; the magnitude of the gain with which the amplifier amplifies the intermediate signal can be greater than one, less than one, or one.

The antenna element 372 radiates an elemental signal 388 in response to the amplified intermediate signal from the amplifier 42.

Other active antenna units 384 operate in a similar manner to generate respective other elemental signals 388.

The control circuit (not shown in FIGS. 18-19) can deactivate one or more of the other antenna units 384 by generating, on the gain-control nodes 52, respective signals that cause the corresponding amplifiers 42 to have gains of approximately zero.

The elemental signals 388 generated by the active ones of the antenna elements 372 interfere with one another to form a beam pattern that corresponds to the gain and phase pattern of the antenna units.

Next, the control circuit (not shown in FIGS. 18-19) causes the MSAT array 370 to steer one or more main beams generated by the active ones of the antenna elements 372 by time sequencing the antenna units 384 through different gain and phase patterns in the manner described above.

Still referring to FIGS. 18-19, alternate embodiments of the MSAT array 370 are contemplated. For example, each of one or more of the antenna units 384 may include multiple amplifiers distributed for balanced driving of the antenna element 372. Furthermore, the transmission medium 12 can be replaced with a cavity configured to carry a standing reference wave such as described above in conjunction with one or more of FIGS. 8-9 and 13-15 instead of being configured to carry a traveling reference wave. Furthermore, embodiments and alternate embodiments described in conjunction with FIGS. 1-17 and 20-21 may be applicable to the MSAT array 370.

Figure 20:
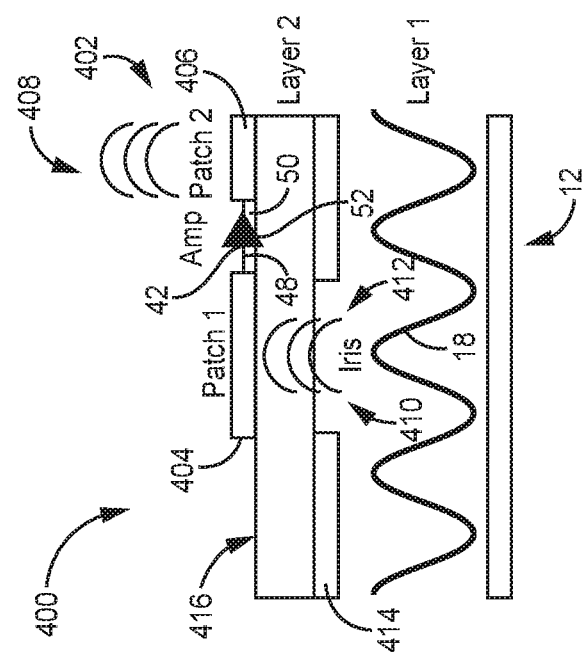
FIG. 20 is a cutaway side view of a waveguide-backed MSAT including distributed controllable signal amplifiers, according to yet another embodiment.

FIG. 20 is a cutaway side view of a waveguide-backed MSAT array 400, which is configured to generate a transmission beam having a power that is significantly higher than the power of a transmission beam that the MSAT array 10 of FIG. 1 is configured to generate, according to an embodiment.

Figure 21:
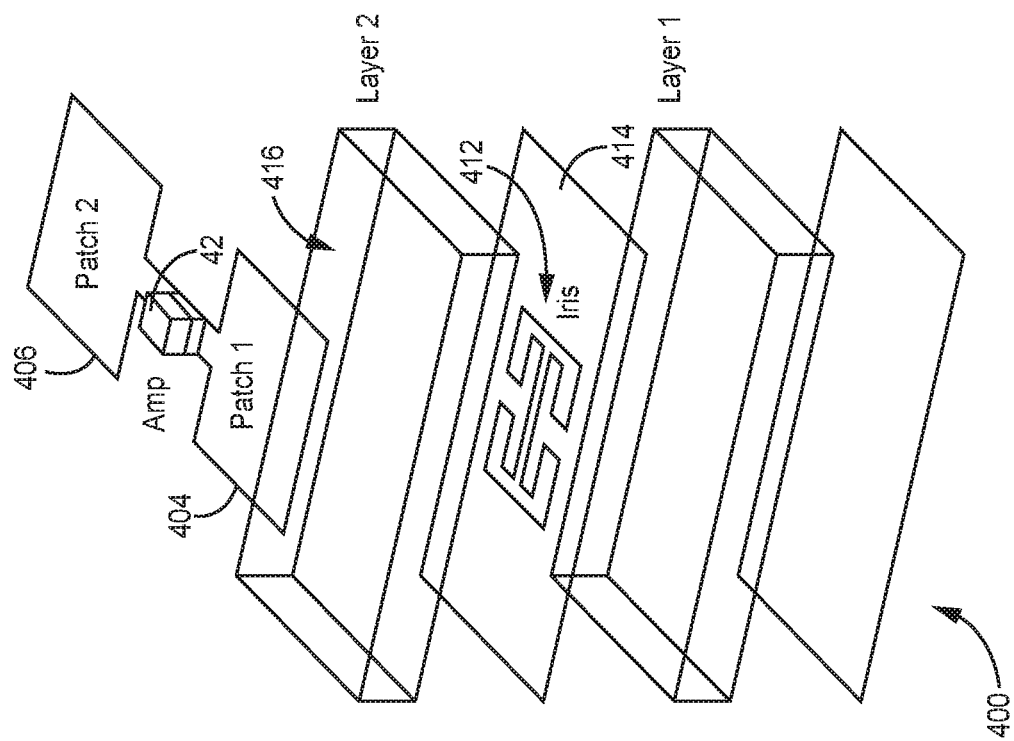
FIG. 21 is an exploded view of the waveguide-backed MSAT of FIG. 20, according to an embodiment.

FIG. 21 is an exploded view of the waveguide-backed MSAT array 400 of FIG. 20, according to an embodiment. In FIGS. 20-21, like numbers are used to reference components common to FIGS. 2 and 20-21. Furthermore, although only one antenna unit 402 is shown in FIGS. 20-21, it is understood that the other antenna units of the antenna array 400 are structurally configured, and operate, in a similar manner.

Referring to FIGS. 20-21, the MSAT array 400 is similar to the MSAT array 40 of FIG. 2 except that the antenna units 402 of the MSAT array 40 each include multiple antenna elements 404 and 406, which are configured to cooperate to radiate a single elemental signal 408.

In addition to the antenna elements 404 and 406, each antenna unit 402 includes a respective signal coupler 410, and a respective amplifier 42.

And each signal coupler 410 includes the respective antenna element 404 and a respective iris 412 formed in an upper conductor 414 of a transmission medium 12. The respective iris 412 can have a resonant structure, for example, as shown in FIG. 21, that allows a reduction in the size of the iris.

Each antenna element 404 has a shape, orientation, and possibly other orientations that impart to the antenna element a signal-receiving characteristic and an impedance that render the antenna element capable of receiving an iris signal that the iris 410 radiates, converting the received iris signal into an intermediate signal, and providing the intermediate signal to an input node 48 of the amplifier 42. For example, a combination of the antenna element 404 and one or more impedances that the antenna element "sees" may be configured to resonate at the frequency of the reference wave 18. The antenna element 404 may also be configured such that it radiates little or no radiation, at least in comparison to an elemental signal 408 that the antenna 406 is configured to radiate.

The amplifier 42 is configured to amplify the intermediate signal from the antenna element 404, and to drive the antenna element 406 with the amplified intermediate signal. The amplifier 42 is disposed over the transmission medium 12 (e.g., mounted on a surface 416 of the MSAT array 400), and includes an input node 48 coupled to the antenna element 404, an output node 50 coupled to the antenna element 406, and a control node 52 configured for coupling to a control circuit (not shown in FIGS. 20-21). Furthermore, although not shown, each amplifier 42 includes a power terminal configured to receive operating power. And the amplifier output node 50 of the amplifier 42 can be coupled to any suitable location of the antenna element 406, for example, so that the impedance of the antenna element at the coupling location approximately matches the output impedance of the amplifier. Likewise, the input node 48 of the amplifier 42 can be coupled to any suitable location of the antenna element 404, for example, so that the impedance of the antenna element at the coupling location approximately matches the input impedance of the amplifier.

As stated above, each antenna element 406 is configured to receive the amplified intermediate signal from an output node 50 of the amplifier 42, is configured to radiate a respective elemental signal 408 in response to the amplified intermediate signal, and has a shape and orientation that impart to the antenna element a radiating characteristic and an impedance that are suitable for the intended application of the array 400. For example, a combination of the antenna element 406, and one or more impedances that the antenna element "sees," may be configured to resonate at the frequency of the reference wave 18. Configuring the antenna element 406 to resonate, or otherwise to be part of a resonant structure, can allow a reduction in the size of the antenna element.

By generating a binary control signal on the control node 52, the control circuit (not shown in FIGS. 20-21) can turn a respective amplifier 42 "on" and "off." While "on," the amplifier 42 receives from the iris 412, and amplifies, the intermediate signal with a gain, and provides, via the output node 50, the amplified intermediate signal to the antenna element 406, which effectively converts the amplified intermediate signal into an elemental signal 408, and which radiates the elemental signal. Alternatively, by generating an analog control signal, or a digital signal having more than two values, the control circuit not only can turn the amplifier 42 "on" and "off," but the control circuit also can control the gain of the amplifier between "on" and "off."

Furthermore, each of the amplifiers 42 can have any suitable circuit topology and operational parameters. For example, each of one or more of the amplifiers 42 can include a single transistor having its control node (e.g., a base if the transistor is a bipolar junction transistor (BJT), a gate if the transistor is a field-effect transistor (FET)) coupled to the control node 52 of the amplifier, and having its conduction nodes (collector and emitter if the transistor is BJT, drain and source if the transistor is an FET) coupled to the input node 48 and output node 50 of the amplifier. Or, each of one of more of the amplifiers 42 can include, or be, a surface-mount operational amplifier having a voltage- or current-controlled gain.

Still referring to FIGS. 20-21, operation of the MSAT array 400 is described, according to an embodiment. Although operation of one antenna unit 402 is described, it is understood that others of the antenna units can be configured to operate in a similar fashion. Furthermore, the reference wave 18 can have any suitable power level (e.g., ≤250 Watts (W), such a few tens of mW to a few tens of W) at the input port (not shown in FIGS. 20-21) to the transmission medium 12. For example, an amplifier 42 having a gain of 30 dB can allow the antenna element 406 to generate an elemental signal 408 having a power of 1 W in response to an intermediate signal having a power of 1 mW at the amplifier input node 48. Consequently, such an embodiment of the array 400 having one thousand antenna units 402, and, therefore, one thousand antenna elements 406, can generate a transmission beam of about 1 KW from a reference wave 18 of 100 mW-10 W at the reference-wave input port (not shown in FIGS. 20-21) of the transmission medium 12.

The iris 412 generates an iris signal in response to the reference wave 18.

The antenna element 404 converts the iris signal into an intermediate signal. The antenna element 404 is configured, ideally, to radiate negligible or no energy such that the intermediate signal has approximately the same power as the iris signal. For example, the antenna element 404 can be a ported device having at least an input port that receives the iris signal and an output port that provides the intermediate signal.

The amplifier input node 48 receives the intermediate signal from the antenna element 404, and the amplifier 42 generates an amplified intermediate signal on the amplifier output node 50 by amplifying the received intermediate signal in response to the gain-control signal that the control circuit (not shown in FIGS. 20-21) generates on the gain-control node 52; the magnitude of the gain with which the amplifier amplifies the intermediate signal can be greater than one, less than one, or one.

The antenna element 406 radiates an elemental signal 408 in response to the amplified intermediate signal from the amplifier 42.

Other active antenna units 402 operate in a similar manner to generate respective other elemental signals 408.

The control circuit (not shown in FIGS. 20-21) can deactivate one or more of the other antenna units 402 by generating, on the gain-control nodes 52, respective signals that cause the corresponding amplifiers 42 to have gains of approximately zero.

The elemental signals 408 generated by the active ones of the antenna elements 406 interfere with one another to form a beam pattern that corresponds to the gain and phase pattern of the antenna units 402.

Next, the control circuit (not shown in FIGS. 20-21) causes the MSAT array 400 to steer one or more main beams generated by the active ones of the antenna elements 406 by time sequencing the antenna units 402 through different gain and phase patterns in the manner described above.

Still referring to FIGS. 20-21, alternate embodiments of the MSAT array 400 are contemplated. For example, the transmission medium 12 can be replaced with a cavity configured to carry a standing reference wave such as described above in conjunction with one or more of FIGS. 8-9 and 13-15 instead of being configured to carry a traveling reference wave. Furthermore, the signal coupler can include a conductive probe that extends from the antenna element 404 to above the iris 412, into the iris, or through the iris and into the transmission medium 12. Moreover, embodiments and alternate embodiments described in conjunction with FIGS. 1-19 may be applicable to the MSAT array 400.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. In addition, any described component or operation may be implemented/performed in hardware, software, firmware, or a combination of any two or more of hardware, software, and firmware. Furthermore, one or more components of a described apparatus or system may have been omitted from the description for clarity or another reason. Moreover, one or more components of a described apparatus or system that have been included in the description may be omitted from the apparatus or system.

The invention claimed is:

1. An antenna, comprising:
a cavity configured to reinforce a reference signal;
couplers configured to generate intermediate signals in response to the reference signal at respective locations within the cavity; and
antenna elements each configured to radiate a respective elemental signal in response to an intermediate signal from a respective one of the couplers.

2. The antenna of claim 1 wherein the reference signal includes a standing reference wave.

3. The antenna of claim 1, further comprising a tuning structure disposed within the cavity and configured to shift a parameter of the reference signal at one or more of the respective locations within the cavity in response to a tuning signal.

4. The antenna of claim 1, further comprising a tuning structure disposed within the cavity and configured to shift a phase of the reference signal at one or more of the respective locations within the cavity in response to a tuning signal.

5. The antenna of claim 1, further comprising tuning structure disposed within the cavity and configured to shift an amplitude of the reference signal at one or more of the respective locations within the cavity in response to a tuning signal.

6. The antenna of claim 1, further comprising:
wherein the cavity includes sub-cavities each including one or more of the respective locations; and
tuning structures each disposed within a respective one of the sub-cavities and each configured to shift a parameter of the reference signal within the respective sub-cavity in response to a respective tuning signal.

7. The antenna of claim 1, further comprising:
wherein the cavity includes sub-cavities each including one or more of the respective locations;
tuning structures each disposed within a respective one of the sub-cavities and each configured to shift a phase of the reference signal within the respective sub-cavity in response to a respective phase-control signal; and
amplifiers each configured to alter a power of the reference signal within a respective one of the sub-cavities in response to a power-control signal.

8. The antenna of claim 1 wherein:
the cavity includes a conductive wall; and
each of the couplers includes a respective iris formed through the conductive wall adjacent to a respective one of the locations and configured to generate a respective one of the intermediate signals in response to the reference signal.

9. The antenna of claim 1, further comprising:
amplifiers each configured to amplify a respective one of the intermediate signals; and
wherein each one of the antenna elements is configured to radiate a respective elemental signal in response to an amplified intermediate signal from a respective one of the amplifiers.

10. The antenna of claim 1 wherein:
the cavity includes a conductive wall; and
each of the couplers includes
a respective iris disposed in the wall adjacent to a respective one of the locations, and
a respective conductor extending at least partially into the iris and configured to generate a respective intermediate signal in response to the reference signal.

11. The antenna of claim 1, further comprising:
wherein the cavity includes sides;
wherein the couplers are disposed on one of the sides of the cavity;
amplifiers disposed on the one of the sides of the cavity, each amplifier configured to amplify a respective one of the intermediate signals in response to a respective power-control signal and with a gain corresponding to a value of the respective power-control signal; and
wherein the antenna elements are disposed on another of the sides of the waveguide.

12. The antenna of claim 1 wherein:
the reference signal has a wavelength; and
the antenna elements are arranged according to a lattice constant that is less than one half the wavelength.

13. The antenna of claim 1 wherein:
the reference signal has a wavelength; and
the antenna elements are arranged according to a lattice constant that is greater than one half the wavelength.

14. A subsystem, comprising:
a transmitter circuit configured to generate an input signal; and
an antenna coupled to the transmitter circuit and including
a cavity configured to convert the input signal into a reference signal and to reinforce the reference signal,
couplers configured to generate respective intermediate signals in response to the reference signal at respective locations within the cavity, and
antenna elements each configured to radiate a respective elemental signal in response to an intermediate signal from a respective one of the couplers.

15. The subsystem of claim 14, further comprising a control circuit configured:
to cause the antenna elements to generate a beam having a first orientation by generating control signals each having a respective value corresponding to the first orientation; and
to steer the beam from the first orientation to a second orientation by generating the control signals each having a respective value corresponding to the second orientation.

16. A system, comprising:
a battery-charging subsystem, including
an antenna subsystem, including
a transmitter circuit configured to generate an input signal, and
an antenna coupled to the transmitter circuit and including
a cavity configured to convert the input signal into a reference signal and to reinforce the reference signal,
couplers configured to generate respective intermediate signals in response to the reference signal at respective locations within the cavity, and
antenna elements each configured to radiate a respective elemental signal in response to an intermediate signal from a respective one of the couplers such that the elemental signals form a beam capable of charging a battery.

17. The system of claim 16 wherein the antenna elements are each configured to radiate the respective elemental signal in response to the intermediate signal from the respective one of the couplers such that the elemental signals form a beam capable of powering an item.

18. The system of claim 16, further comprising an item including the battery.

19. The system of claim 18 wherein the item includes a drone.

20. The system of claim 16 wherein the battery-charging subsystem includes:
a tracking circuit configured to determine a position of an item; and
wherein the control circuit is configured to cause the antenna elements to generate a beam that impinges upon the item by generating each of the control signals having a respective value corresponding to the position of the item.

21. A method, comprising:
reinforcing a reference signal in a cavity;
generating intermediate signals in response to the reference signal at respective locations within the cavity; and
radiating a respective elemental signal in response to a respective one of the intermediate signals.

22. The method of claim 21, further comprising shifting a parameter of the reference signal at one or more of the locations within the cavity by altering a respective impedance at each of the one or more locations in response to a respective tuning signal.

23. The method of claim 21, further comprising:
shifting a phase of the reference signal within each of one or more sub-cavities of the cavity in response to a respective phase-control signal, each of the sub-cavities including one or more of the respective locations; and
altering a power of the reference signal within each of the one or more sub-cavities in response to a respective power-control signal.

24. The method of claim 21, further comprising providing versions of the reference signal at respective input locations of the cavity, the versions of the reference signal each having a respective power.

25. The method of claim 21, further comprising:
providing versions of the reference signal at respective input locations of the cavity; and
altering a respective power level of each of at least one of the versions of the reference signal.

26. The method of claim 21, further comprising forming a beam pattern by radiating each elemental signal from a respective radiating location.

27. The method of claim 26, further comprising:
wherein forming the beam pattern includes forming a beam; and
charging a battery with the beam.

28. The method of claim 26, further comprising:
wherein forming the beam pattern includes forming a beam;
tracking a position of a flying object that includes a battery; and
steering the beam in response to the tracked position to charge the battery.

29. The method of claim 26, further comprising:
wherein forming the beam pattern includes forming a beam; and
powering an object with the beam.

30. The method of claim 26, further comprising:
wherein forming the beam pattern includes forming a beam;
tracking a position of a flying object; and
steering the beam in response to the tracked position to power the object.

31. The method of claim 26, further comprising:
wherein forming the beam pattern includes forming a beam;
tracking a position of a flying drone; and
steering the beam in response to the tracked position to power the drone.

* * * * *